(12) United States Patent
Collazo

(10) Patent No.: US 7,363,370 B2
(45) Date of Patent: Apr. 22, 2008

(54) MULTI-PLATFORM OPTIMIZATION MODEL

(75) Inventor: Carlos M. Collazo, Redwood Shores, CA (US)

(73) Assignee: MetiLinx, Miami, FL (US)

( * ) Notice: Subject to any disclaimer, the term of this patent is extended or adjusted under 35 U.S.C. 154(b) by 0 days.

(21) Appl. No.: 11/442,683

(22) Filed: May 26, 2006

(65) Prior Publication Data

US 2007/0039009 A1    Feb. 15, 2007

Related U.S. Application Data

(63) Continuation of application No. 11/175,657, filed on Jul. 5, 2005, now abandoned, which is a continuation of application No. 09/976,518, filed on Oct. 12, 2001, now abandoned.

(60) Provisional application No. 60/243,783, filed on Oct. 26, 2000.

(51) Int. Cl.
*G06F 15/173* (2006.01)
(52) U.S. Cl. ...................... 709/224; 719/319
(58) Field of Classification Search ......... 709/223, 709/224, 202; 719/319, 320
See application file for complete search history.

(56) References Cited

U.S. PATENT DOCUMENTS

| | | | | |
|---|---|---|---|---|
| 5,375,199 | A * | 12/1994 | Harrow et al. | 715/771 |
| 5,819,028 | A | 10/1998 | Manghirmalani et al. | |
| 5,890,014 | A * | 3/1999 | Long | 710/8 |
| 5,949,976 | A * | 9/1999 | Chappelle | 709/224 |
| 6,205,477 | B1 | 3/2001 | Johnson et al. | |
| 6,301,615 | B1 * | 10/2001 | Kutcher | 709/224 |
| 6,393,455 | B1 * | 5/2002 | Eilert et al. | 718/105 |
| 6,513,065 | B1 * | 1/2003 | Hafez et al. | 709/224 |
| 6,622,157 | B1 * | 9/2003 | Heddaya et al. | 709/202 |
| 6,647,412 | B1 * | 11/2003 | Strandberg et al. | 709/223 |

(Continued)

FOREIGN PATENT DOCUMENTS

EP    0 849 912 A2    8/1997

(Continued)

OTHER PUBLICATIONS

Hansen "A Method for Optimizing Large Scale parallel Applications", 1995 IEEE, pp. 192-201.*

(Continued)

*Primary Examiner*—Van H. Nguyen
(74) *Attorney, Agent, or Firm*—Townsend and Townsend and Crew LLP

(57) ABSTRACT

A network optimization system that uses multiple devices having different combinations of hardware and software (i.e., platforms). The system assesses, controls and optimizes network performance, providing an efficient interface for installing, configuring and operating various features of the optimization system. Intelligence objects operate at the server node level to dynamically analyze system processes at each server node. One feature allows an object to generate a number representing a local utilization, a measure of one or more performance factors in the platform hosting the object. The local utilization value can be passed to another platform system hosting a second intelligence object, generating its own local utilization value or combining its local utilization value with the passed value to create a composite utilization value that reflects performance of both platforms. Where different values are from different platforms, the system resolves, adjusts, or normalizes the values to achieve a composite value.

23 Claims, 23 Drawing Sheets

U.S. PATENT DOCUMENTS

| | | |
|---|---|---|
| 6,714,976 B1 * | 3/2004 | Wilson et al. ............... 709/224 |
| 6,738,813 B1 * | 5/2004 | Reichman ................... 709/224 |
| 6,748,416 B2 | 6/2004 | Carpenter et al. |
| 6,807,580 B2 | 10/2004 | Freeman et al. |
| 7,020,532 B2 * | 3/2006 | Johnson et al. ............... 700/89 |
| 2002/0002613 A1 | 1/2002 | Freeman et al. |
| 2002/0073226 A1 | 6/2002 | Sridhar et al. |
| 2002/0133593 A1 | 9/2002 | Johnson et al. |
| 2003/0046396 A1 | 3/2003 | Richter et al. |
| 2003/0154284 A1 | 8/2003 | Bernardin et al. |
| 2004/0103139 A1 | 5/2004 | Hubbard et al. |
| 2004/0210632 A1 | 10/2004 | Carlson et al. |
| 2007/0005330 A9 | 1/2007 | Hardwidk et al. |

FOREIGN PATENT DOCUMENTS

| | | |
|---|---|---|
| EP | 0 940 754 A1 | 9/1999 |
| WO | WO 01/25887 A1 | 4/2001 |

OTHER PUBLICATIONS

Sabb et al. "A Flexible Moniroring Platform to Build Cluster Management Services", 2000 IEEE, pp. 258-265.*

Buyya, R. "PARMON: a portable and scalable monitoring system for clusters," Software-Practice and Experience, 2000, vol. 30, pp. 723-739.

* cited by examiner

MULTI-PLATFORM OPTIMIZATION MODEL

CLAIM OF PRIORITY

This application claims priority from U.S. Provisional Patent Application No. 60/243,783, filed Oct. 26, 2000.

CROSS-REFERENCES TO RELATED APPLICATIONS

This application is related to the following co-pending applications, each of which is incorporated by reference as if set forth in full in this application:

U.S. Patent Application entitled "System-Wide Optimization Integration Model" (020897-000110US) filed on Oct. 12, 2001, Ser. No. 09/976,368 (now abandoned); U.S. Patent Application entitled "Aggregate System Resource Analysis Including Correlation Matrix and Metric-Based Analysis" (020897-000130US) filed on Oct. 26, 2001, Ser. No. 10/040,012; and U.S. Patent Application entitled "Application Program Interface for Optimization Integration Model" (020897-000140US) filed on Oct. 26, 2001, Ser. No. 10/055,404.

BACKGROUND OF THE INVENTION

Digital computer networks, such as the Internet, are now used extensively in many aspects of commerce, education, research and entertainment. Because of the need to handle high volumes of traffic, many Internet sites are designed using several groups of server computers. An example of a site network system is shown in FIG. 1.

In FIG. 1, network system 10 includes four major tiers. These are communications tier 12, web tier 14, application tier 16 and database tier 18. Each tier represents an interface between a group of server computers; or other processing, storage or communication systems. Each interface handles communication between two groups of server computers. Note that the tiers are significant in that they represent the communication protocols, routing, traffic control and other features relating to transfer of information between the groups of server computers. As is known in the art, software and hardware is used to perform the communication function represented by each tier.

Server computers are illustrated by boxes such as 20. Database 22 and Internet 24 are represented symbolically and can contain any number of servers, processing systems or other devices. A server in a group typically communicates with one or more computers in adjacent groups as defined and controlled by the tier between the groups. For example, a request for information (e.g., records from a database) is received from the Internet and is directed to server computer 26 in the Web-Com Servers group. The communication takes place in communications tier 12.

Server computer 26 may require processing by multiple computers in the Application Servers group such as computers 20, 28 and 30. Such a request for processing is transferred over web tier 14. Next, the requested computers in the Application Servers group may invoke computers 32, 34, 36 and 38 in the Database Servers group via application tier 16. Finally, the invoked computers make requests of database 22 via database tier 18. The returned records are propagated back through the tiers and servers to Internet 24 to fulfill the request for information.

Of particular concern in today's large and complex network systems is the performance monitoring and optimization of the system. The task of providing efficient monitoring information is made very difficult when a network uses multiple different sets of hardware and software (i.e., platforms). For example, database server 32 might be an Intel-brand processor running Microsoft's Access database under Microsoft's NT operating system. Database server 34 can be a Sun platform running an Oracle database. Application servers can include Intel/Microsoft, Unix, or other platforms. Similarly, web page servers can be any of a number of platforms. In general, any platform, or other combination of hardware and software (including operating systems, application programs, applets, plug-ins, dynamic link libraries, routines, or other processes) might be used at any point in a network system.

Obtaining and analyzing performance and resource utilization characteristics is very difficult in multi-platform networks. This is because performance and usage parameters will not have the same meaning in different environments in different platforms.

Thus, it is desirable to provide a system that improves upon the prior art.

BRIEF SUMMARY OF THE INVENTION

In one embodiment the invention provides an optimization system for networks that use multiple different devices having different combinations of hardware and software (i.e., platforms).

The system accurately assesses, controls and optimizes performance of such networks. The invention provides an efficient user interface for installing, configuring and operating various features of the optimization system. Intelligence objects operate at the server node level to dynamically analyze system processes at each server node. The analysis of system processes is extensive and includes hardware, software, operating system and communications.

One feature allows an object to generate a number representing a local utilization value. The local utilization value is a measure of one or more performance factors in the platform hosting the object. The local utilization value can be passed to another platform system hosting a second intelligence object. The second intelligence object can generate its own local utilization value or can combine its local utilization value with the passed value to create a composite utilization value that reflects performance of both platforms. Where different values are from different platforms, the system resolves, adjusts, or normalizes the values to achieve a composite value.

In one embodiment the invention provides a method for monitoring the performance of a digital networked system, wherein the system includes first and second platforms. The method comprising generating a first value indicating a characteristic of operation of the first platform; transferring the first value to the second platform; obtaining a second value indicating a characteristic of operation of the second platform; and combining the first and second values into a composite value by adjusting one of the first or second values to account for a difference in operation characteristics between the first and second platforms.

BRIEF DESCRIPTION OF THE DRAWINGS

FIG. 5M shows the Confirmation dialog with security turned on;

DETAILED DESCRIPTION OF THE INVENTION

A preferred embodiment of the present invention is incorporated into products, documentation and other systems and materials created and distributed by MetiLinx, Inc. as a suite of products referred to as "Metilinx iSystem Enterprise" system. The Metilinx system is designed to optimize digital networks, especially networks of many computer servers in large Internet applications such as technical support centers, web page servers, database access, etc.

The system of the present invention uses software mechanisms called "intelligence objects" (IOs) executing on the various servers, computers, or other processing platforms, in a network. The intelligence objects are used to obtain information on the performance of a process or processes, hardware operation, resource usage, or other factors affecting network performance. Values are passed among the intelligence objects so that a composite value that indicates the performance of a greater portion of the network can be derived.

Figure 2A:
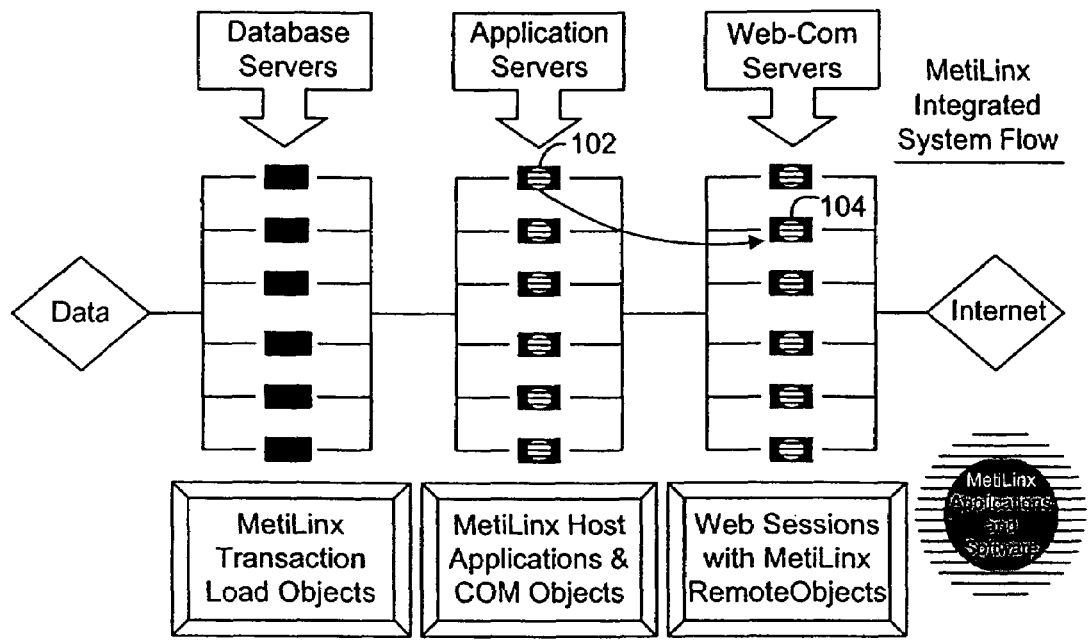
FIG. 2A shows intelligence objects and performance value passing in the present invention.

FIG. 2A illustrates intelligence objects and value passing. In FIG. 2A, intelligence objects such as 102 and 104 reside in computer servers. Any number of intelligence objects can reside in a server computer and any number of server computers in the n-tiered system can be equipped with one or more intelligence objects. A first type of intelligence object is a software process called a system level object (SLO) that can monitor and report on one or more aspects of other processes or hardware operating in its host computer server. A second type of intelligence object, called a transaction level object (TLO) is designed to monitor transaction load with respect to its host computer or processes executing within the host computer.

In one embodiment, IO 102 measures a performance characteristic of its host computer and represents the characteristic as a binary value. This value is referred to as the "local" utilization value since it is a measure of only the host computer, or of transaction information relating to the host computer. The local utilization value is passed to IO 104. IO 104 can modify the passed value to include a measurement of its own host computer. The modified value is referred to as a "composite" utilization value. The composite utilization value can, in turn, be passed on to other intelligence objects that continue to build on, or add to, the measurements so that performance across multiple computer, tiers, operating systems, applications, etc., is achieved.

Ultimately, the utilization value, or values, is passed on to other processes which can display the result of the combined measurements to a human user, use the result to derive other results, use the result to automate optimization of the n-tiered system, or use the result for other purposes. One aspect of the invention provides for redirecting processes and interconnections on the network based on the assessed utilization values of the computers, or nodes, in order to improve, or optimize, network performance. The processes that perform the redirection are referred to as "process redirection objects" (PROSE).

Note that although the invention is sometimes discussed with respect to a multi-tiered server arrangement that any arrangement of servers, computers, digital processors, etc., is possible. The term "processing device" is used to refer to any hardware capable of performing a function on data. Processing devices include servers, computers, digital processors, storage devices, network devices, input/output devices, etc. Networks need not be in a multi-tiered arrangement of processing devices but can use any arrangement, topology, interconnection, etc. Any type of physical or logical organization of a network is adaptable for use with the present invention.

Figure 2B:
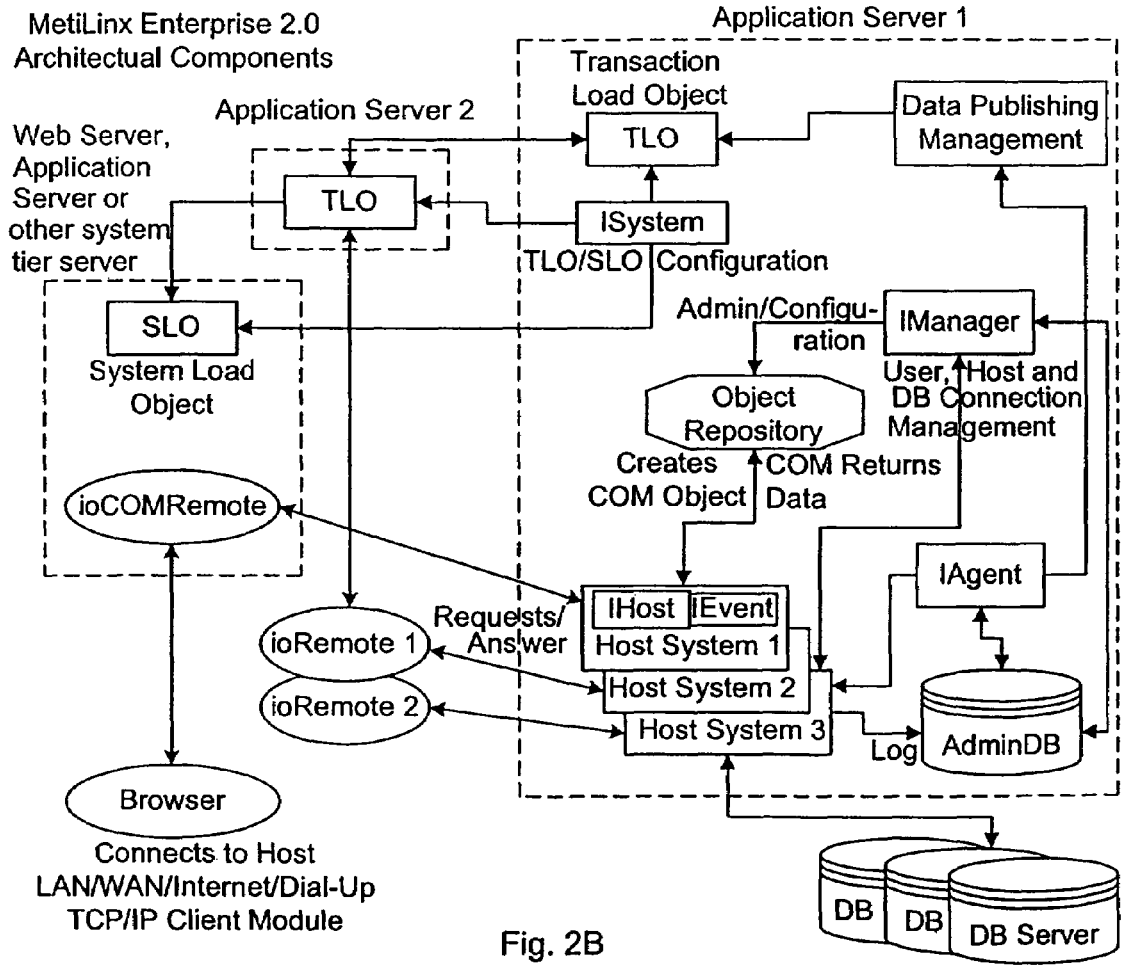
FIG. 2B illustrates architectural components of the present invention.

FIG. 2B illustrates one possible arrangement of more specific components of the present invention. Note that the term "component" as used in this specification includes any type of processing device, hardware or software that may exist or may be executed within or by a digital processor or system.

Figure 1:
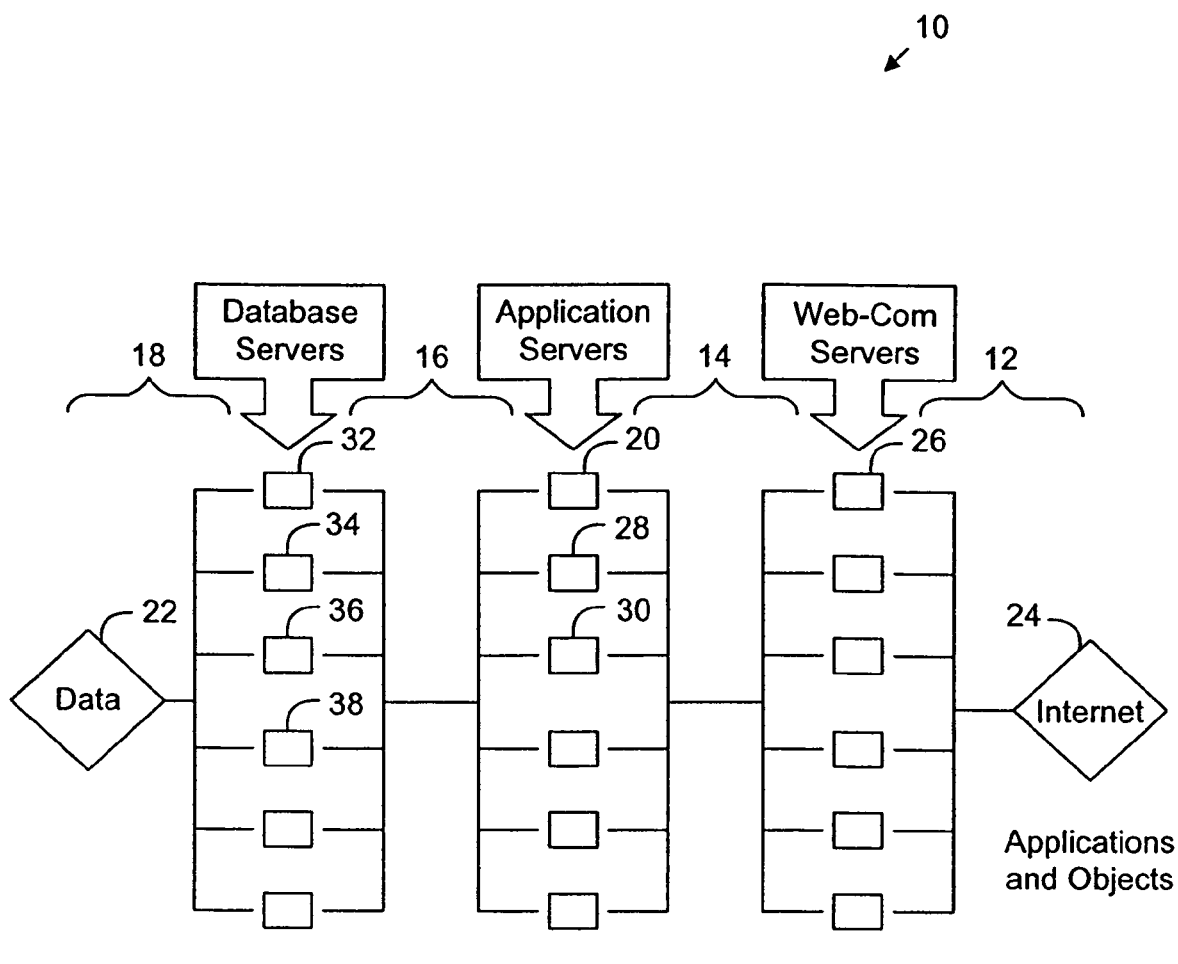
FIG. 1 shows a prior art network system.

Systems such as those illustrated in FIGS. 1, 2A and 2B, along with virtually any type of networked system, can be provided with IOs. In a preferred embodiment, the IOs are installed on each server in the network in a distributed peer-to-peer architecture. The IOs, along with aggregation software, discussed below, measure real-time behavior of the servers components, resources, etc. to achieve an overall measure of the behavior and performance of the network. A preferred embodiment rates and aggregates network components using a system-wide model discussed in the related applications discussed, above.

The preferred embodiment collects data on low-level system and network parameters such as CPU utilization, network utilization, latency, etc. The data is produced and shared in small four-byte values. In a hierarchy set up by an administrator, or automatically configured by the system, a value is combined with other values to achieve a composite value. The composite value is then passed along the hierarchy and used to obtain further composited values so that overall system performance is ultimately provided in the composited values.

One problem with using composite values that are maintained from node-to-node is that a network may have multiple different hardware and software components at different points in the system. Typically, hardware for executing software, combined with operating system software is referred to as a "platform." For purposes of this application, "platform" refers to any combination of hardware and software, or portion thereof, used to allow other software, or processes, including the nodes of the present invention, to execute. In this sense, any given platform, may change frequently over time as processes are terminated and started, hardware is reconfigured, etc.

Figure 2C:
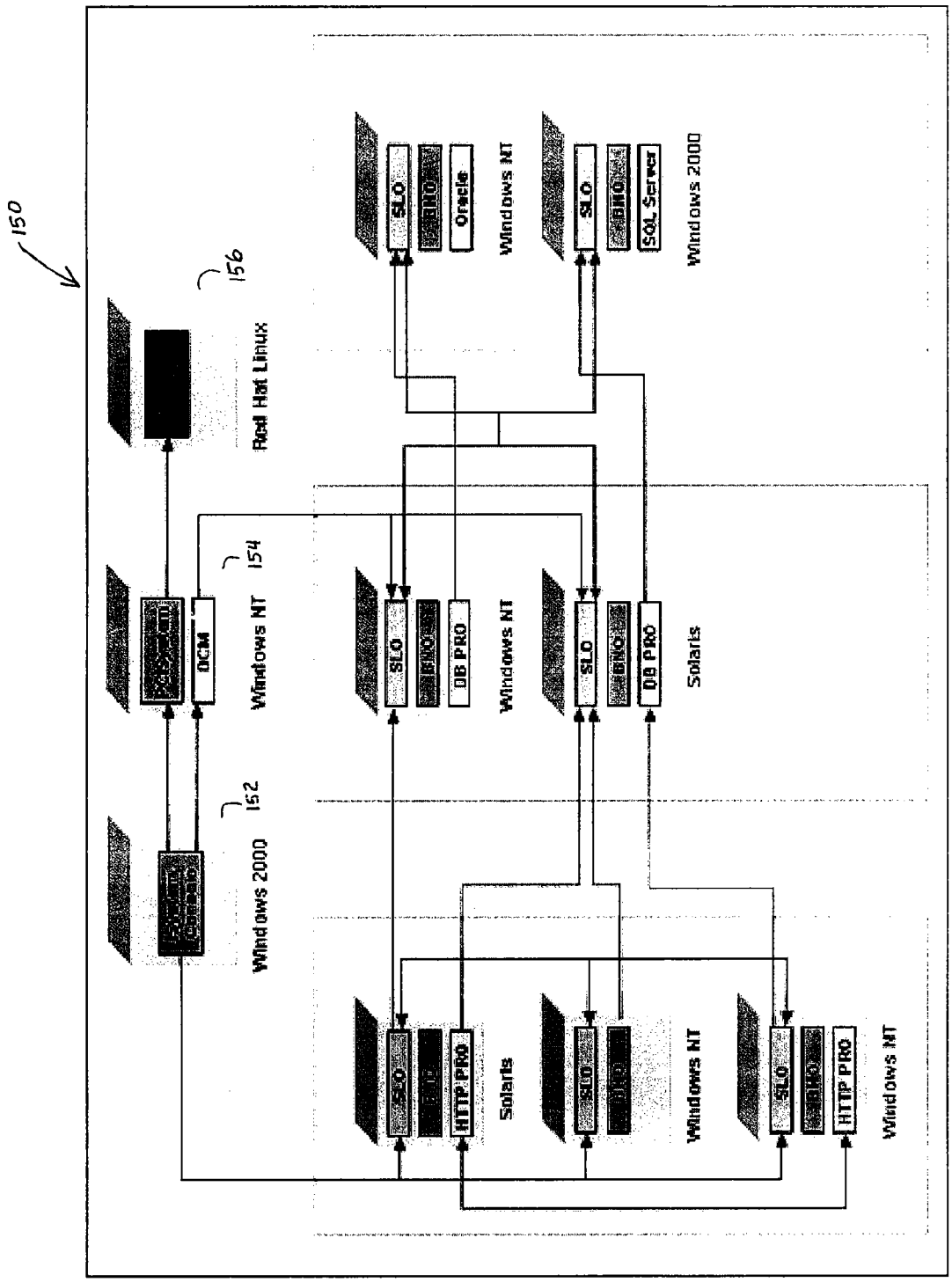
FIG. 2C illustrates a network system with multiple platforms.

FIG. 2C illustrates a network system with multiple platforms.

In FIG. 2C, network system 150 includes various components, including server computers shown as blocks. Each server computer can use different hardware such as different numbers and types of central processing units (CPUs), amounts and types of memory, architecture, peripherals, etc.

Different software can also be used. For example, server 152 executes the Windows 2000 operating system while server 154 executes Windows NT and server 156 executes Linux. Other servers are shown executing different application programs and operating systems. Naturally, any number and type of hardware and software can be employed. Further, the network configuration can vary widely from that shown in FIG. 2C. In general, any network configuration can be used with the present invention.

Values which are intended to convey the same meaning may, in fact, have different meanings in association with different platforms. For example, processor speed, instructions per second, interrupts, input/output operations, number and priority of threads, number and type of forked processes, memory management, block allocation, etc. have different effective meanings depending on the platform that is being measured or reported. Thus, it is important to adjust, resolve, normalize or homogenize, values with respect to the different platforms so that the values can be combined, or composited, as described, below, for more effective reporting and monitoring.

For example, one parameter that is accumulated is the number of blocks allocated by the operating system over time. This parameter is meaningful since it reflects the memory utilization of a component, or platform, in the system. However, different operating systems may use different size blocks so just keeping track of the number of blocks would give inaccurate results. Other factors which lead to incompatible comparisons and use of the block allocation parameter is the number of blocks available in the system, the overhead involved (e.g., processor cycles, memory, etc.) in performing the block allocation, etc.

One embodiment of the invention stores, e.g., the memory block size for different platforms. When a block allocation parameter is received from a platform (e.g., as part of a LNV or CNV, discussed, below) the parameter is adjusted according to the block size. For example, where a block allocation parameter comes from a platform where the block size is one-half the block size on a platform executing a node that receives the parameter, the node adjusts the parameter by a factor of two to account for the difference between the two platforms. In this manner, the parameter values can be combined, or composited, to achieve the benefits discussed below.

A network set up with the IOs and other monitoring, analysis and optimization tools as discussed herein is referred to as a Dynamic Aggregate System Process Optimization (DASPO) network. There are three basic phases of operating a DASPO to achieve network improvement or optimization. These phases are (1) set-up, (2) analysis and (3) optimization. In a preferred embodiment, the system of the present invention provides various user tools, including console interfaces, to allow a human user to participate in the different phases. However, provision is also made for automating the different phases to varying degrees.

The operation and implementation of the three phases is heavily dependent on the system-wide model employed by the present invention. The system-wide model is discussed, below, in connection with the three phases and user interfaces for controlling the three phases.

Set-Up

Figure 3A:
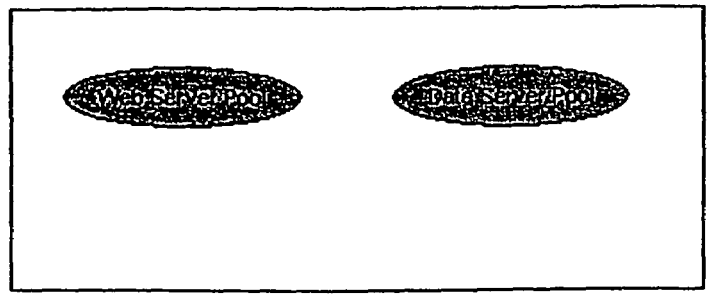
FIG. 3A illustrates a user interface display to set up node resource pools.

There are five basic steps in setting up a DASPO network, as follows:

Define Node Resource Pools (NRPs)
Add Nodes
Install Intelligence Objects on Selected Nodes
Define Functional Resource Pools (FRPs); and
Establish Connectivity and Data Flow FIG. 3A illustrates a user interface display to set up node resource pools. In FIG. 3A, node pools are displayed as ovals with labels. NRPs are used to group nodes for organizational purposes. NRPs are used in place of the tier illustration approach of FIGS. 1A and 2A. NRPs can be used to create the equivalent of a tiered structure, or they can be used to create other structures of nodes. FIG. 3A shows a Web Server Pool and a Data Server Pool. An Application Server Pool, or other, user defined pool, can be created and labeled. Any number of pools can be defined.

Figure 3B:
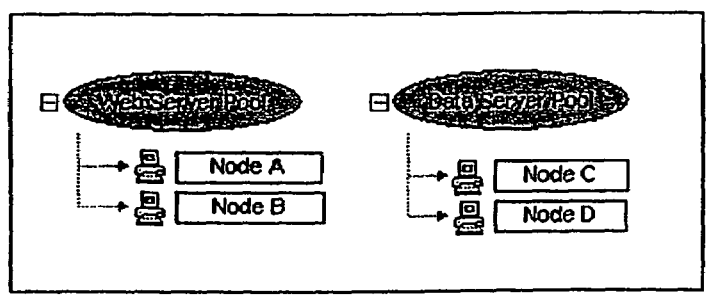
FIG. 3B illustrates a user interface where a user has added specific nodes.

FIG. 3B illustrates a user interface where a user has added specific nodes to the defined NRPs. Nodes can be added by selecting them individually from an existing domain, or by providing specific internet protocol (IP) addresses. A preferred embodiment of the invention uses nodes that follow standard internet conventions such as machine, or IP, addresses. However, other embodiments may use other protocols, standards, etc., to define nodes. Node names can be generic, as shown in FIG. 3B, or they can be given unique names by a user, or assigned automatically. Naturally, any number and type of node can be assigned to a pool. The pool/node hierarchy is displayed and manipulated much like a familiar file management system.

Figure 3C:
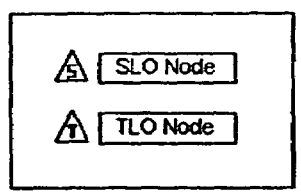
FIG. 3C illustrates the representation of intelligence objects.

FIG. 3C illustrates the representation of intelligence objects (IOs). IOs are defined and associated with nodes.

Two types of IOs are provided in a preferred embodiment. These are the System Level Object (SLO) and Transaction Level Object (TLO). Each IO is typically identified by the icon to the left of the descriptive text. The icon is placed adjacent to a node in which, or to which, the IO corresponds. During operation, the IO gathers information on the operation and resource use of components at the node.

SLOs can be grouped into pools. The preferred embodiment provides two types of pools as (1) Functional Resource Pools to organize SLOs for nodes that support a common application so that nodes with like functionality are grouped; and (2) Node Resource Pools for organizing FRPs and SLOs for nodes that provide a common service. Links between pools and nodes indicate where functional relationships exist. NRPs and FRPs link together to provide system process flow and to define sub networks for optimization calculations.

Figure 3D:
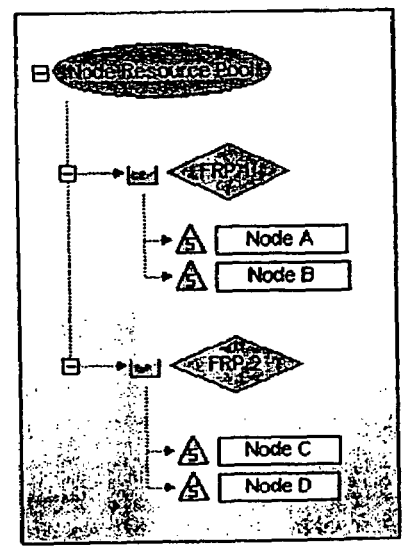
FIG. 3D illustrates further organizing of nodes in NRPs into Functional Resource Pools.

FIG. 3D illustrates organizing of nodes in NRPs into Functional Resource Pools.

Once NRPs have been created and nodes assigned, the NRPs can be further subdivided into Funcitonal Resource Pools (FPRs). The FRPs provide a refinement of node function by allowing nodes to be grouped according to specific roles assigned to the FRPs (i.e., Managerial Login servers, Staff Login servers, etc). One or more FRPs can be created inside a NRP, as shown in FIG. 3D. In a preferred embodiment, only SLO and TLO nodes can belong to an FRP.

Figure 3E:
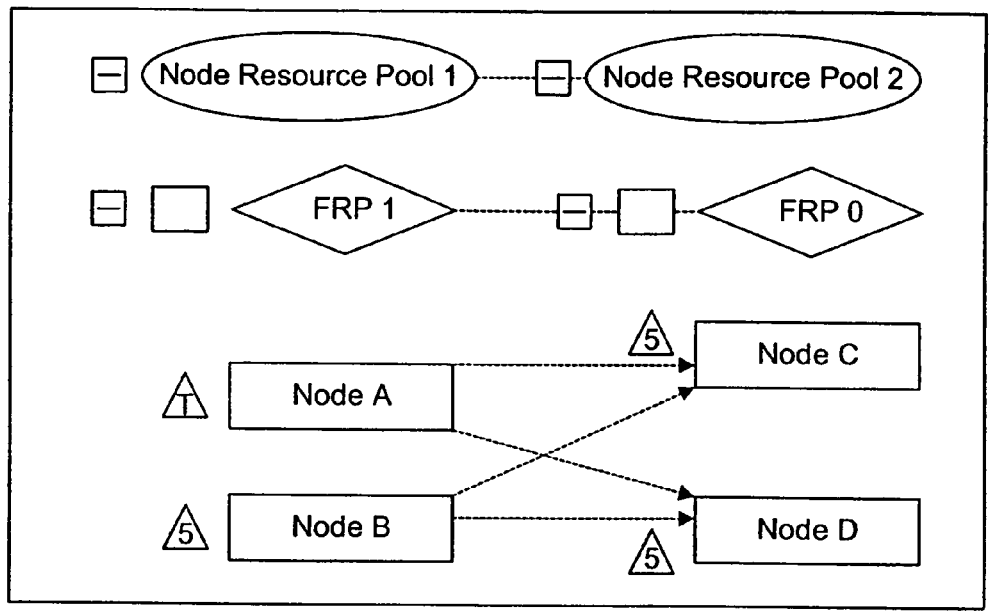
FIG. 3E illustrates establishing connectivity and data flow among NRPs, FRPs and nodes.

FIG. 3E illustrates establishing connectivity and data flow among NRPs, FRPs and nodes.

An important step in configuring a network involves determining the route that transactions will take when they move through the system. Routes are determined by the way pools and nodes are linked together. There are three different levels at which links can be defined, as follows:

a. Node Resource Pool to Node Resource Pool
  b. Functional Resource Pool to Functional Resource Pool
  c. Node to Node In a DASPO network, NRPs represent the lowest level of detail and nodes represent the highest level. Connections made at higher levels of detail will override the connections made at lower levels. Linking also has certain important implications. For example, if two NRPs are linked, the inference is made that every FRP and every node within the two pools is connected, as shown in FIG. 3E.

Network management is simplified by allowing connections to be made at different levels. Initial connections can be made quickly and simply when establishing an initial network transaction process flow since higher level connections automatically define lower-level connections. For example, a pool-to-pool connection automatically defines lower FRP and node connections with respect to FRPs and nodes within the connected pools. As more network fine-tuning becomes necessary, a refinement of the initial set of links, at a more detailed level, is possible (i.e. node-to-node).

Defining network connections results in the creation of DASPO subnetworks. A DASPO subnetwork is a specific relationship defined between nodes that are linked together across Functional Resource Pools. Subnetworks can, but need not, have a correlation to the physical or logical network organization. For example, subnetworks can follow the multi-tiered design discussed above where each of three subnetworks corresponds to web, application and database tiers. The concept of subnetworking allows a user to flexibly define transaction flows across a network when calculating ideal system optimization.

Figure 3F:
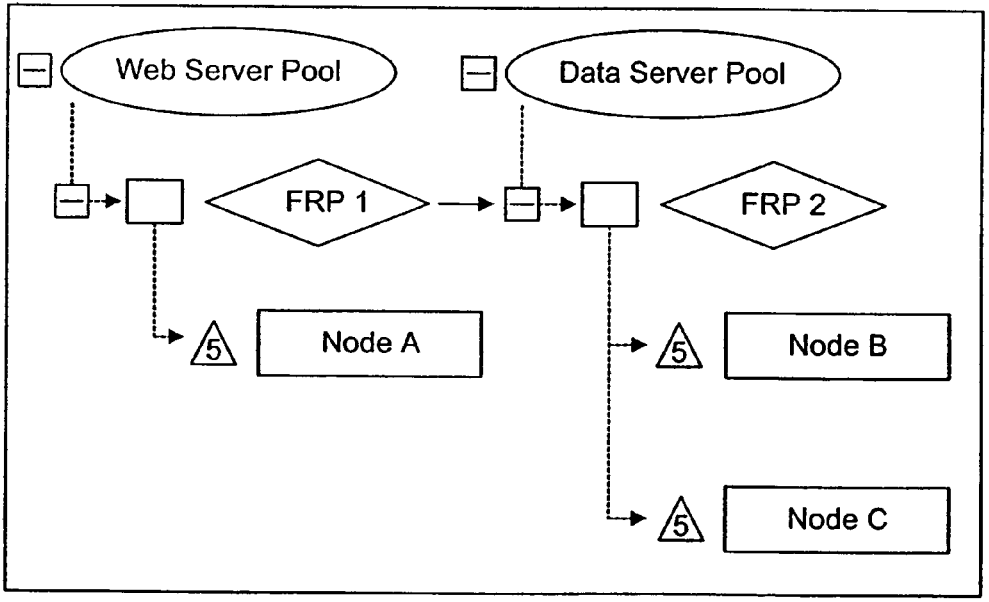
FIG. 3F illustrates a connection made between FRP 1 and FRP 2.
Figure 3G:
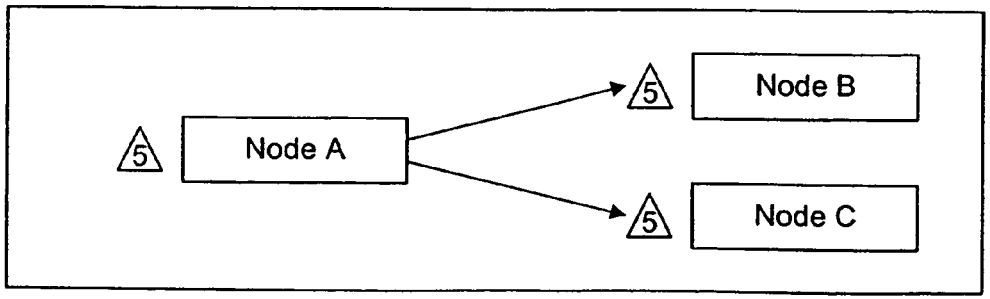
FIG. 3G shows a subnetwork.

FIG. 3F illustrates a connection made between FRP 1 and FRP 2. This creates a subnetwork among nodes associated with the FRPs. A subnetwork exists from the "A" node as shown in FIG. 3G. The "A" subnetwork includes nodes B and C from FRP 2.

When nodes are grouped together in Functional Resource Pools, their SLOs and TLOs communicate Local Node Value (LNV) and other intelligence object information to each other. As a result of this communication, each node is aware of the value of every other node in its FRP and, if queried, can identify the Best Node. The Best Node is defined as the server within a particular FRP that is able to handle a system transaction with the greatest efficiency at a given moment. A detailed description of value formats, value passing, composite values and other uses of values can be found in related patent application (3), cited above.

From the LNV of a first node, and from the LNVs of other nodes related to the first node in a subnetwork, a Composite Node Value (CNV) is calculated. A preferred embodiment of the invention uses normalized weights to rank the contribution of the LNV and CNV of every node in the subnetwork associated with the first node. The preferred embodiment takes network latency into account to modify passed CNV and/or LNV values when the values are passed to different nodes.

One feature of a preferred embodiment is that the nodes gather data in the form of CNVs and LNVs and the data is accumulated by a central console, or computer system, operable or accessible to a human user for monitoring and control. This approach allows a administrator to monitor, log, analyze, adjust and optimize separate aspects of a network system. Past, recent and current performance of the network is provided. The network can be automatically instructed by the console (or another system or process) to act in accordance with measured parameters (e.g., based on the CNV and LNV data) to redirect data transfers to the best available resources, nodes, or other components. This approach of distributed, hierarchical, peer-to-peer value gathering to a central console provides efficient and accurate system management.

When DASPO subnetworks are created, an FRP process has information on the best node to utilize at any point in time. The "best node" may not necessarily be the the least utilized node. By providing a global view of system performance, an FRP process can determine nodes which, if routed to, would provide overall system performance improvement. Similarly, an FRP is aware of best nodes for routing or other utilization in the FRP's subnetwork, allowing for faster rerouting decisions and improved resource utilization.

Figure 3H:
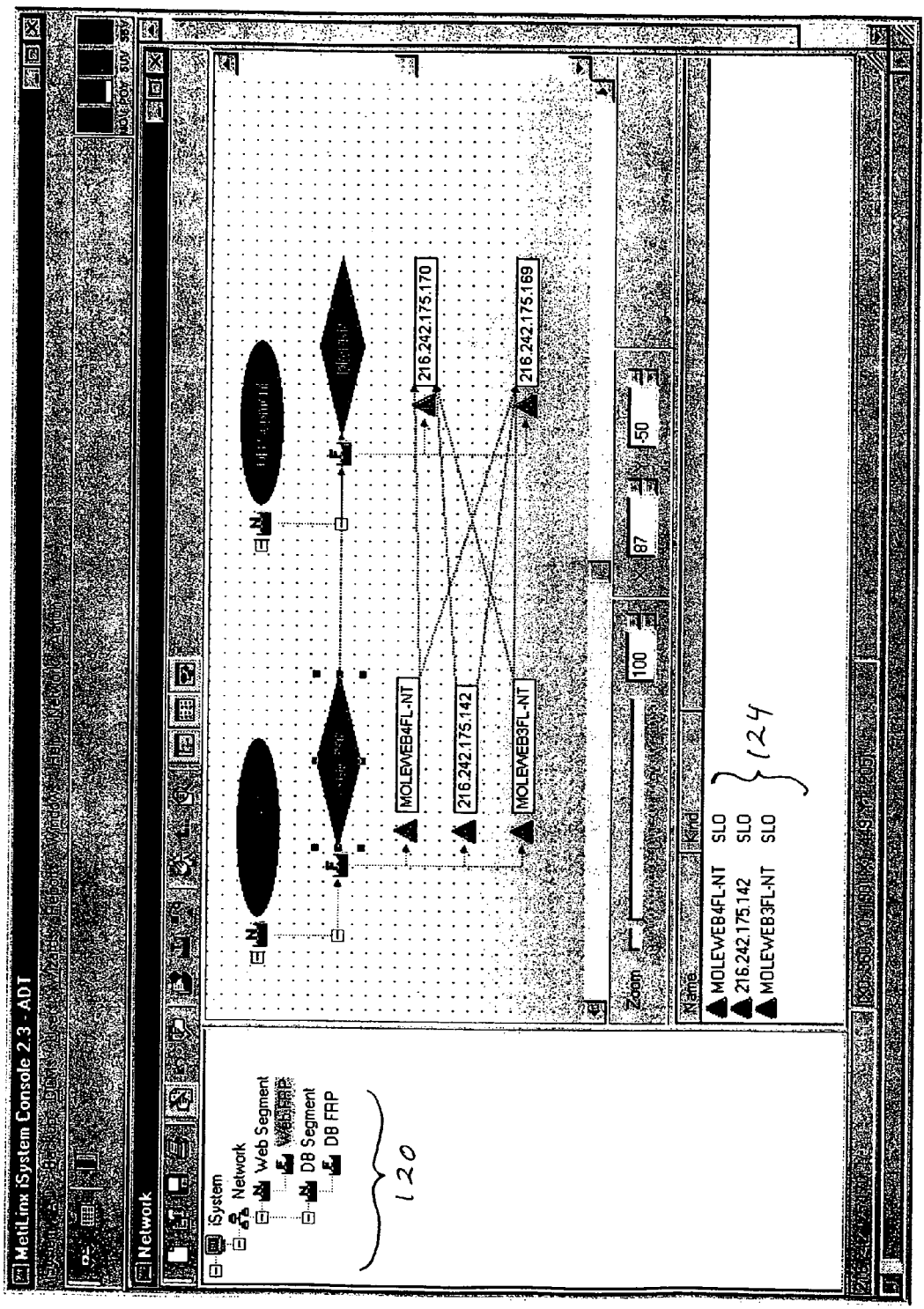
FIG. 3H illustrates a screen shot of a user interface display to allow a user to set-up a DASPO.

FIG. 3H illustrates a screen shot of a user interface display to allow a user to set-up a DASPO.

In FIG. 3H, the features discussed above are shown, including the use of pools, FRPs and SLOs interconnected to form subnetworks. Area 120 is used to set up subnetworks. Area 122 is used to define interconnections. Area 124 is used to provide details on objects and to allow a user to easily select objects for use.

Analysis

Figure 4A:
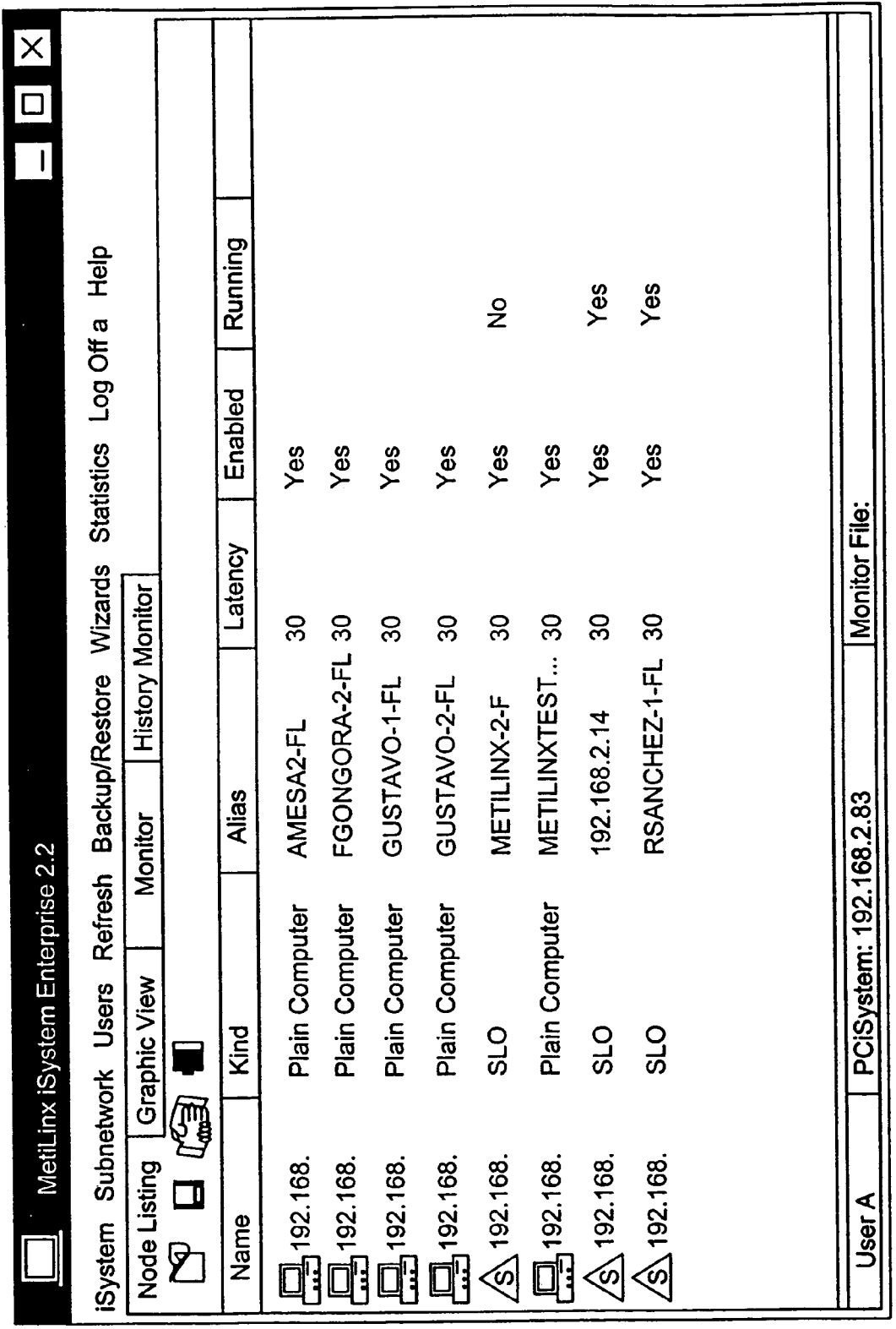
FIG. 4A illustrates the Node Listing console.

Analysis includes monitoring and administration functions. Users can view results of node data-gathering which indicates the performance of system components, transfers, etc. Various administrative functions can be performed such as saving and modifying configurations, scheduling events, Four consoles, or basic types of interfaces, are used to help direct network optimization and manage the administration. The consoles are as follows:

1. Node Listing Console
2. Graphic View Console
3. Monitor Console
4. History Monitor Console FIG. 4A illustrates the Node Listing console.

The Node Listing console provides a list of all the network nodes that are part of the current loaded network configuration, as well as the current status of those nodes. The console is also the location from which user access can be managed; different network configurations can be saved and loaded; backups can be initiated, and Wizards, or automated assistance, for redirectors and System Level Objects (SLOs) can be started.

Figure 4B:
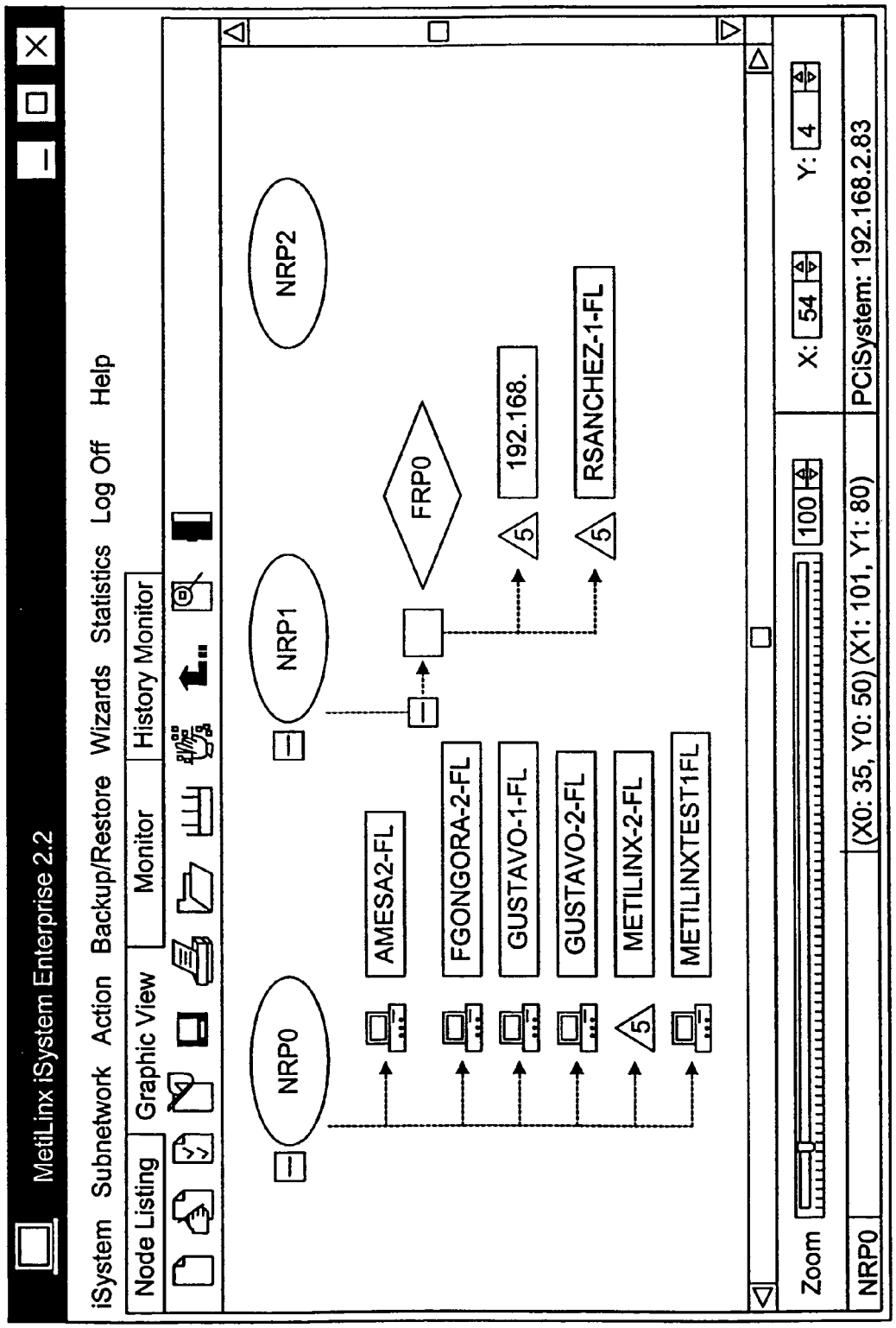
FIG. 4B illustrates the Graphic View console.

FIG. 4B illustrates the Graphic View console.

The Graphic View console allows users to visually identify and manipulate the various nodes, pools and connections in a DASPO network in an easy-to-use graphical user interface.

Figure 4C:
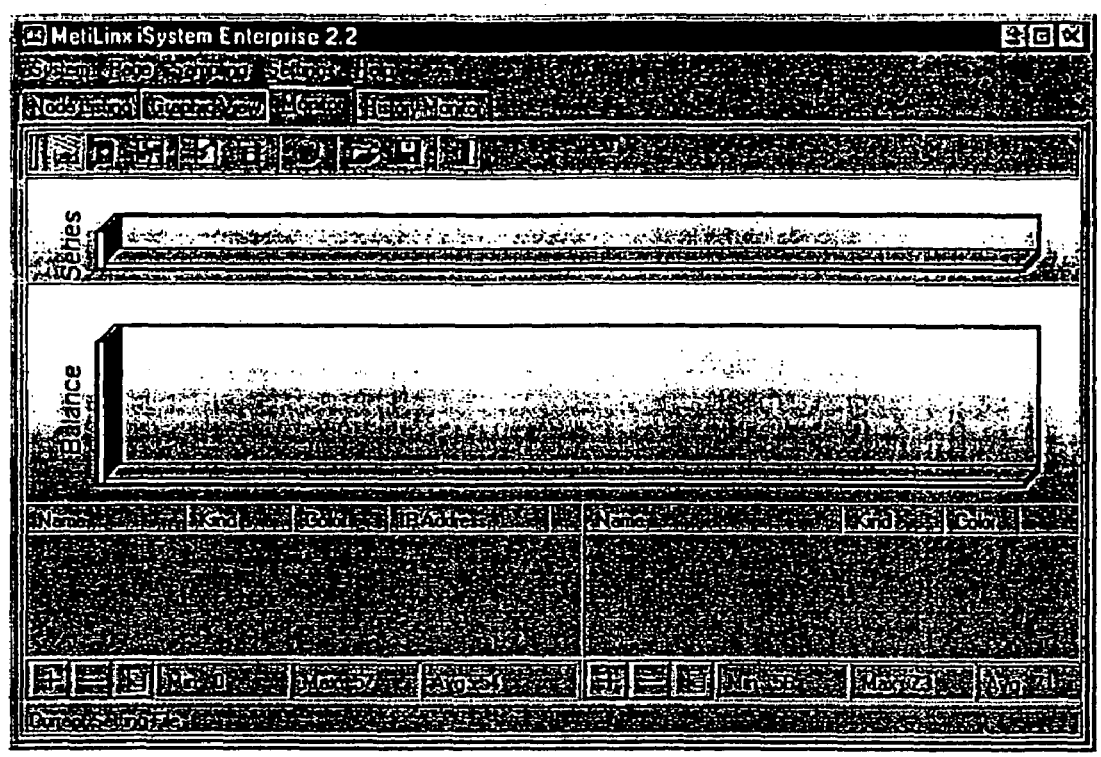
FIG. 4C illustrates the Monitor console.

FIG. 4C illustrates the Monitor console. The Monitor console is a real-time tracking feature that measures the available processing capacity of selected nodes in DASPO network to help assess node performance. The node information is displayed in a simple graph or bar format, and the data can be tracked and saved for future reference.

The Monitor console can provide several different graphs for visual presentation of information.

Figure 4D:
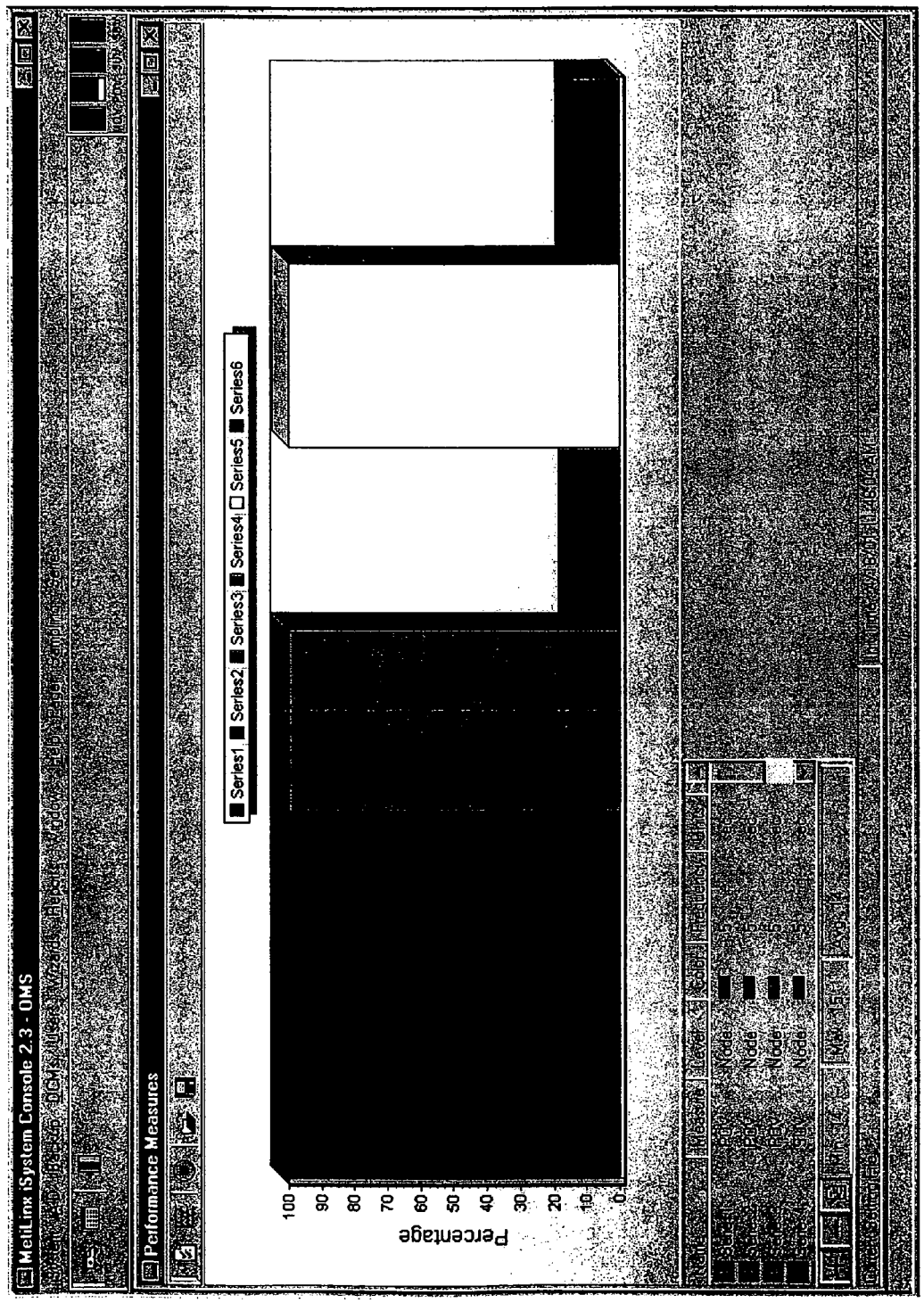
FIG. 4D illustrates a series graph of the Monitor Console.

FIG. 4D illustrates a series graph of the Monitor Console.

In the series graph, selected SLO and TLO nodes appear with statistical values 0 to 100 for each node at a given instant in time. The statistical value reflects the current load capacity of the node. The higher the value, the more processing capability is available to be utilized. A lower value indicates an overworked node that has a low processing capacity.

Host nodes that are selected to be monitored will appear in the Host graph. This graph performs identically to the Series graph.

The Percentage graph measures the statistic values of SLO, TLO and Host nodes together on the same graph. This graph performs similarly to the Series and the Host graphs.

Figure 4E:
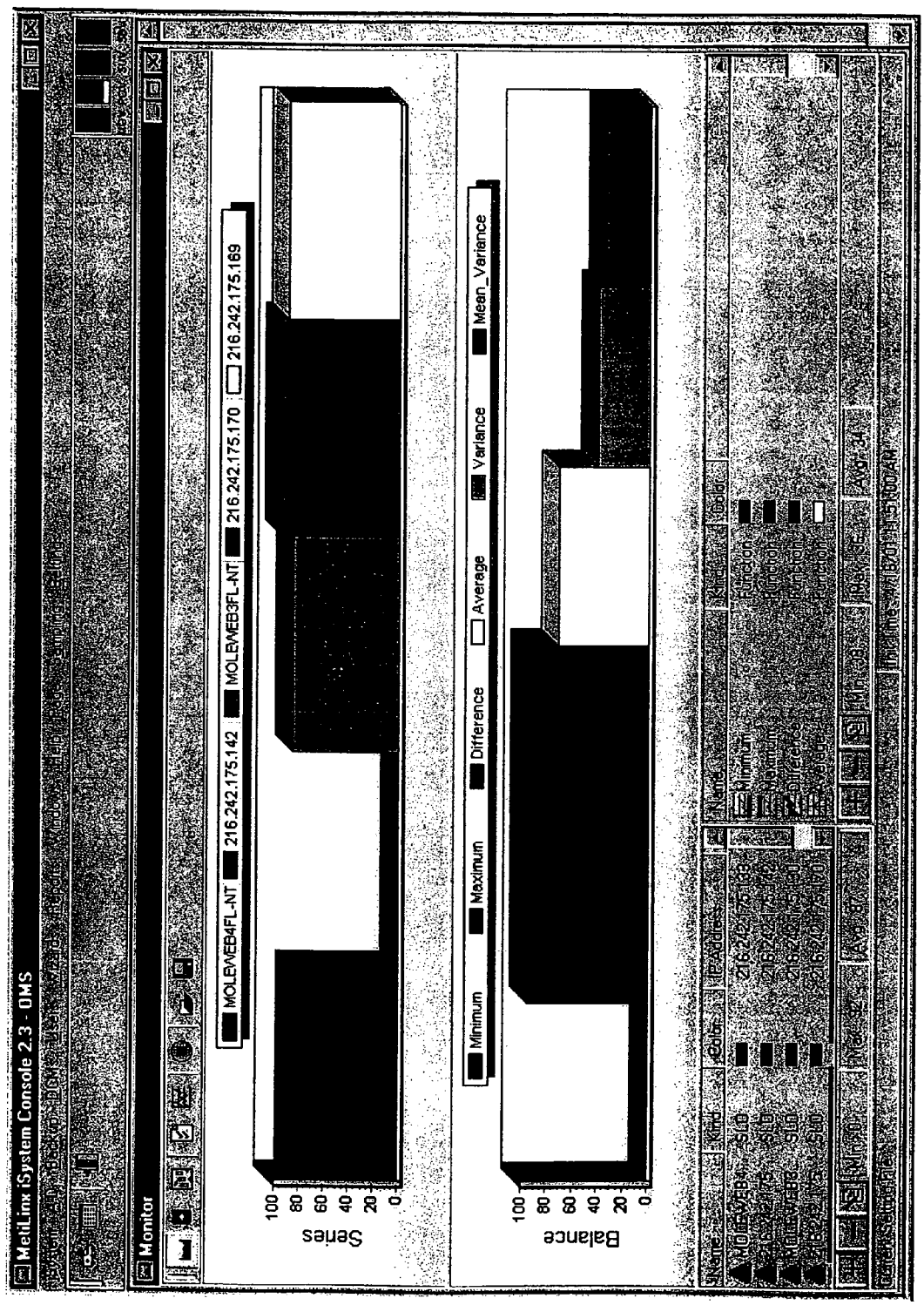
FIG. 4E illustrates a balance graph of the Monitor Console.

FIG. 4E illustrates a balance graph of the Monitor Console.

In the balance graph, statistical differences between the nodes is shown. Examples of types of differences that can be displayed include average, variance, maximum, minimum etc. These variances are shown visually on one or more bar graphs. A list of available balance variables can be selected and applied by a user. This graph appears beneath the Series and the Host graph in the iSystem Enterprise monitor. Note that the Balance graph does not appear when a Mixed Series is selected.

Before node statistics or balance variables can be displayed in the Monitor graphs, the nodes to be monitored must first be selected. There are two selector fields at the bottom of the Monitor screen shown in FIG. 4E. The left-hand selector field 132 is used for adding SLO, TLO or Host nodes. The right-hand selector field 134 is used to add balance variables. (Note: the balance variable selector is not available when a Mixed Series is selected).

Figure 4F:
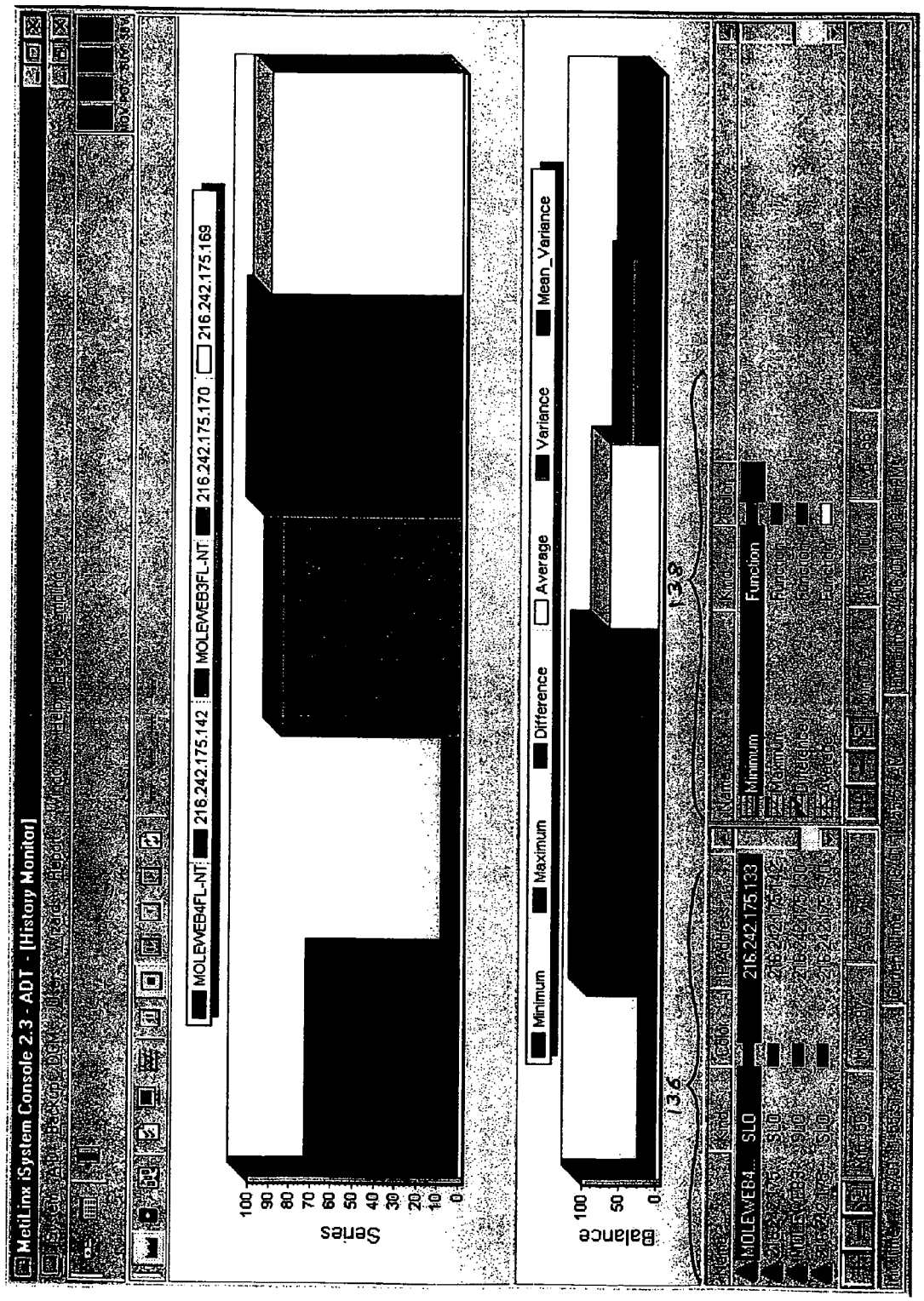
FIG. 4F illustrates the History Monitor.

FIG. 4F illustrates the History Monitor.

When network nodes are tracked using the Monitor feature the captured data is stored, for future reference, in a log file. This log file can be accessed and displayed at any time using the History Monitor console. The History Monitor also provides a variety of features that allows saved data to be manipulated, displayed and compared in a variety of different ways. Note: In order to use the History Monitor feature, nodes must first be set up and tracked using the Monitor. For more information, see Monitor Console.

The History Monitor provides several graphs similar to those described, above, for the Monitor Console.

The History Monitor includes a series graph where monitored SLO and TLO nodes appear. This graph displays a statistical value (from 0 to 100) for each selected network node at a given instant in time. This statistical value reflects the load capacity of the node. The higher the value, the more processing capability is available to be utilized. A lower value indicates an overworked node that has a low processing capacity.

Monitored Host nodes will appear in the Host graph of the History Monitor. This graph performs identically to the Series graph.

The Percentage graph of the History Monitor displays the monitored statistic values of SLO, TLO and Host nodes together on the same graph. This graph performs identically to the Series and the Host graphs.

The statistical differences between the nodes (i.e. average, variance, maximum, minimum etc.) can be measured in the balance graph of the History Monitor. A list of available balance variables can be selected and applied by a user. This graph appears beneath the Series and the Host graph in the iSystem Enterprise monitor. Note that the Balance graph does not appear when a Mixed Series is selected.

Before the node statistics that have been captured in the monitor can be displayed in the History Monitor graphs, the nodes to be monitored must first be selected. There are two selector fields at the bottom of the History Monitor screen of FIG. 4F. The left-hand selector field 136 is used for adding SLO, TLO or Host nodes. The right-hand selector field 138 is used to add balance variables. (Note: the balance variable selector is not available when a Mixed Series is selected).

Optimization

Part of the optimization process is accomplished by redirecting requests and connections within Functional Resource Pools. This is achieved using data generated by SLO-nodes, which compute their own statistics and broadcast the results through the pools.

This way of implementing redirection is available to every application implemented in-house. However, there are many pre-packaged applications and objects commonly used, whose code cannot—and probably shouldn't—be altered. These types of applications include web servers and COM-objects. Due to the different nature of requests and connections that take place in a complex network system, specific objects must handle redirection inside each class of calls. A preferred embodiment of the present invention includes objects for redirecting HTTP-requests and OLE DB-connections. However, other embodiments can employ other objects in other environments and on other platforms such as HTTP in Java, DB in C++, etc., on Linux, Solaris, etc.

An HTTP Redirector is a Windows-based application (HTTPRedir.EXE) capable of receiving HTTP-requests and redirecting them to a selected web server according to some predefined selection criteria. Starting from a list of web servers and a selection method, this application gathers load-statistics and availability from the web servers and effectively redirects the requests transparently to the requesting client.

The HTTP Redirector can be used in different ways to accomplish its tasks. Its interaction with clients and web servers depends on the place it's located, the port it's using for listening and the links defined on the accessed pages at the web servers. Issues regarding server affinity, client sessions, etc, must be handled by the web administrator.

OLE DB-Connection Redirector is a DCOM server packed into a Windows-based executable (OLEDBRedir.EXE). This object is able to keep track of the load-statistic of a set of database servers and to supply a predefined connection string corresponding to the selected database server when requested. This redirector object needs to be alive to monitor the database severs. Therefore, it's necessary that the application be manually started once it's installed. This represents a difference to commonly used automation servers that are automatically activated upon client requests.

The redirector deployment and installation process consists of five main stages:
1. Select nodes for redirector installation
2. Specify server general settings for each node
3. Specify file-transfer and remote-execution settings for each node
4. Execute redirector installation procedure
5. Configure the installed redirector The remote installation mechanism is built around a Windows application (RSLOSetup.EXE) and a set of auxiliary files that are actually moved to the target node to perform the installation. From this point another mechanism launches the installation process on the remote node. For UNIX/Linux platforms, SLO will be installed as a daemon. For Windows-based platforms, SLO will be installed as a regular application included in the Startup folder for every user.

1. Selecting Nodes for Redirector Installation

Figure 5A:
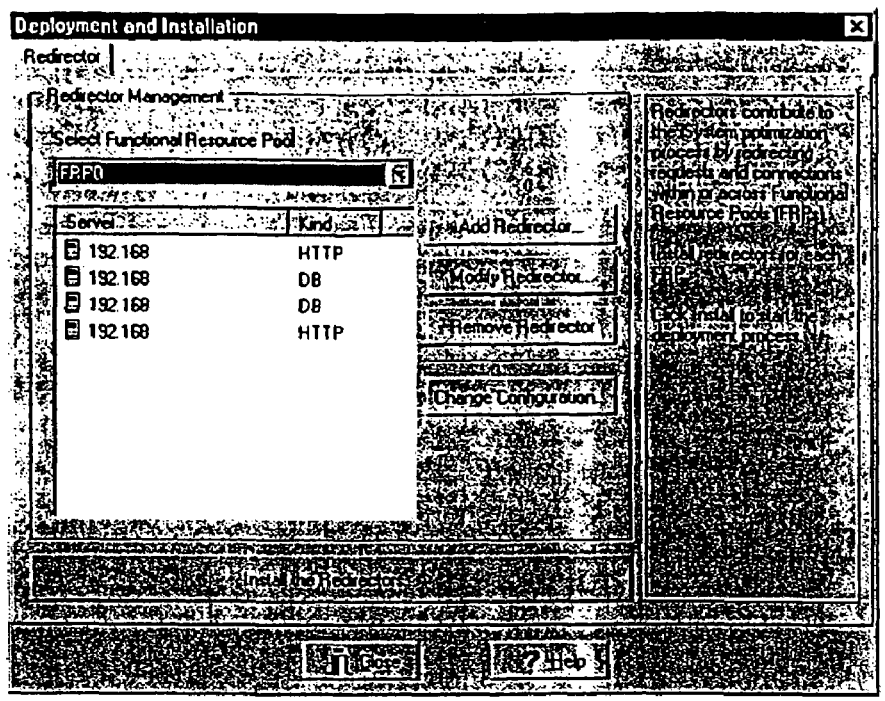
FIG. 5A shows the Redirector Deployment and Installation window.

FIG. 5A shows the Redirector Deployment and Installation window.

By choosing the control "Select Functional Resource Pool" a list of available FRPs appears from the drop-down menu. "Add Redirector" allows the selection of the IP address for a node that is to be designated as a redirector. "Modify Redirector" allows an existing node to be reconfigured so that a different node takes its place as a redirector, or a different type of redirector (HTTP or DB) is used. "Remove Redirector" removes a server that is highlighted by the user from the Deployment and Installation window.

"Change configuration" allows the installed redirector to be configured for use once nodes have been selected as redirectors and the file transfer and execution is complete. "Install All the Redirectors" is selected after nodes have been chosen for the installation of redirectors. The Install operation takes the user to the Redirectors Remote Setup window where the transfer and execution of redirector files can commence.

2. Specifying Server General Settings

Once nodes have been selected for redirector installation, the Redirectors Remote Setup window opens.

Figure 5B:
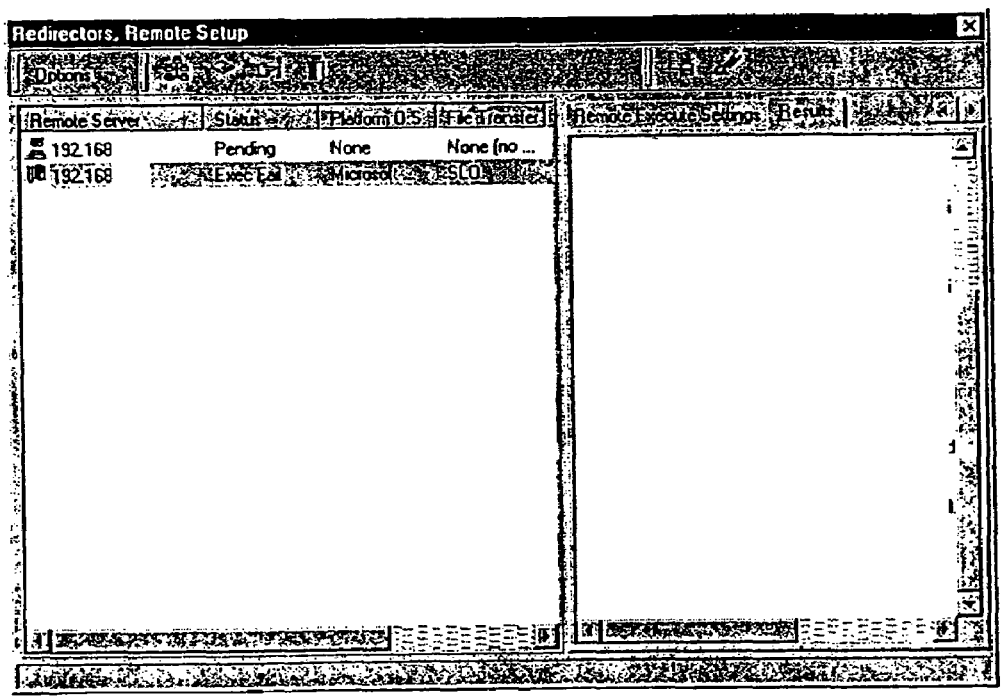
FIG. 5B illustrates the redirector's Remote Set-Up window.

FIG. 5B illustrates the Redirectors Remote Setup window.

The Redirectors Remote Setup window is used to define the operating system, file-transfer and remote-execution mechanisms for each node. (Nodes are referred to as Remote Servers in this window.) Selecting different file-transfer and remote-execution mechanisms will activate corresponding tabs which will appear behind a General Settings tab, discussed below. These new tabs can require separate configuration, as discussed in detail in the next section. Changes to general settings are reflected in the list of nodes in the left-hand Remote Server field.

Note that certain restrictions apply during this portion the setup. For example, DCOM is only available to Windows platforms. In some cases, selecting the option "None" for an operation mechanism is useful. For example, if the corresponding files are already placed on a node (due to a previous attempt to install or because common drives are used), only remote execution is required.

3. Specifying File-Transfer and Remote-Execution Settings

Figure 5C:
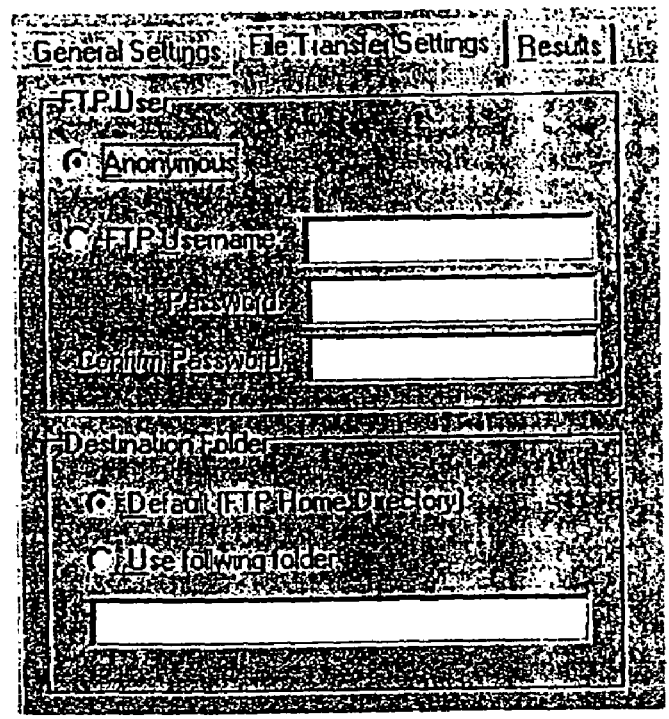
FIG. 5C shows the File Transfer Settings for a file transfer protocol tab.

Depending on the file-transfer and remote-execution mechanisms that were selected in previous steps, one or more new tabs appears behind a General Settings tab. Each tab can be "active" and brought to the forefront by clicking on the tab. FIG. 5C shows the File Transfer Settings for file-transfer protocol (FTP) tab. FTP settings require specifying the FTP username and password (if applicable) and the FTP destination directory. By default an anonymous username and the Home directory are set.

Figure 5D:
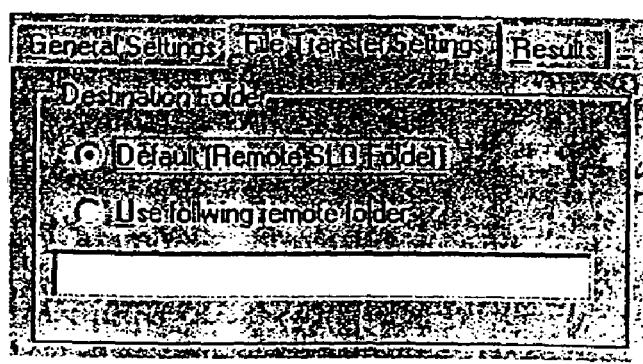
FIG. 5D shows a destination folder where redirector files are transferred.

When using SLO, the destination folder where the redirector files will be transferred is required, as shown in FIG. 5D. By default, the files will be transferred to the default remote SLO folder.

Figure 5E:
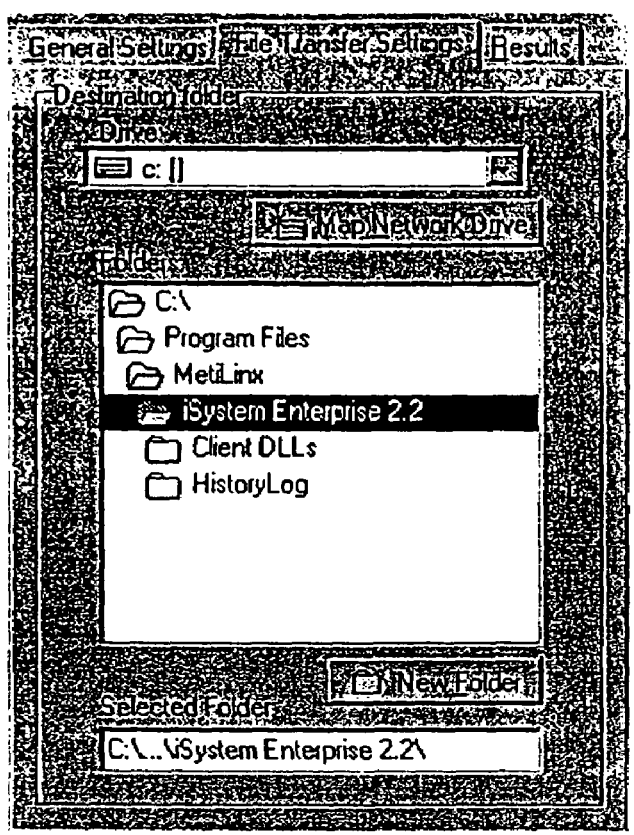
FIG. 5E shows a destination folder specified when using a shared network drive to transfer files.

When using a shared network drive to transfer files, a Destination Folder must be specified, as shown in FIG. 5E. This folder points to a drive (local to the target node) that is shared along the network and mapped locally (at a central point). Common functionalities, such as mapping a network drive or creating a new folder are included. Note that file-transfer operations are carried out using the current user credentials, which means the current user must have enough rights to perform the operations.

Figure 5F:
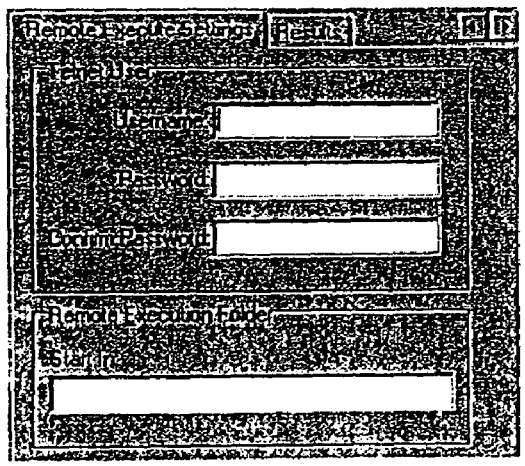
FIG. 5F shows dialog pertaining to launching a remote set-up using a telnet protocol.

When launching a remote setup using the telnet protocol, as shown in FIG. 5F, username and password are required. The Remote Execution Folder points to a local folder (on the remote server) where the setup files were moved during the file-transfer step.

Figure 5G:
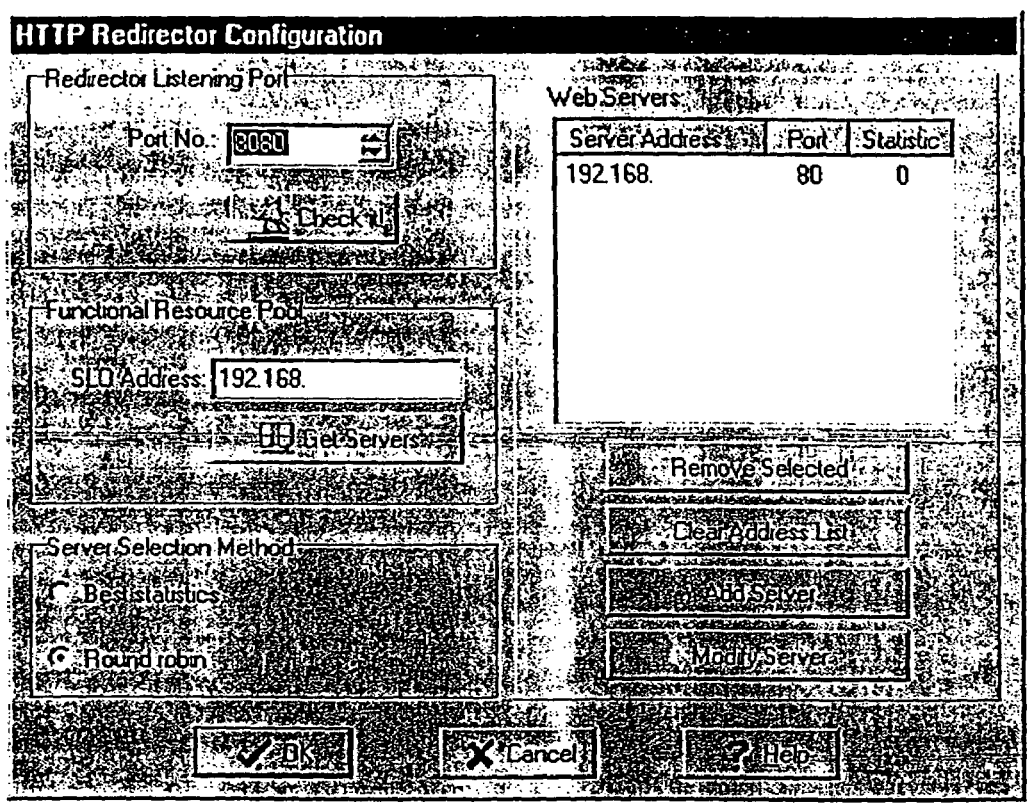
FIG. 5G illustrates a portion of the user interface for preparing a redirector.

Redirector configuration is the final step in preparing a redirector for use in a DASPO network. FIG. 5G illustrates a portion of the user interface for preparing a redirector.

A Redirector Listening Port is a port number used by the redirector to listen for HTTP requests. Port 80 is used by web servers to listen and by web browsers to connect. It is recommended that this port number be used for the redirector if the redirector will be performing as a web server. It is important to note that only one application can be listening on one port, therefore the redirector cannot coexist with a web server on the same computer if both are listening through the same port. The Check It! button verifies that the selected port number is available, meaning no other local application is currently listening on this port. When configuring the redirector from iSystem Enterprise, the Check it! button is disabled.

A Functional Resource Pool is the source list of web servers. The SLO Address field refers to an SLO-node installed in one of the computers belonging to the pool. Statistics will be retrieved from a single SLO instead of asking individually. To retrieve the list of servers from the SLO-node the Get Servers button is pressed.

The Server Selection Method directs how servers are selected for redirection. Choices include a web server with Best Statistics or in a Round Robin fashion. Note that a server is not be selected if it doesn't contain the requested object, even if its turn has come up for redirection.

A list of web servers available for redirection is displayed. These are the web servers that might receive transaction requests. Web servers can be added, removed or modified using the displayed list. The Remove Selected button removes a selected web server from the list. The removed server is not be included in any further redirection. The Clear Address List button clears all web servers from the list. The Add Server button adds a new web server to the list. The Modify Server button modifies the parameters corresponding to a server in the list.

A preferred embodiment uses a DCOM server packed into a Windows-based executable process called an "OLE DB-Connection Redirector." This object is able to keep track of the load-statistic of a set of database servers and to supply a predefined connection string corresponding to the selected database server when requested. This redirector object must be active to monitor the database severs. Therefore, the application must be manually started once installed. This is different from commonly used automation servers that are automatically activated upon client requests.

Instead of directly assigning connection strings to their connection objects, developers create a remote instance of the redirector and request a valid connection string from it. Using this connection string guarantees that the best available database server is selected.

Figure 5H:
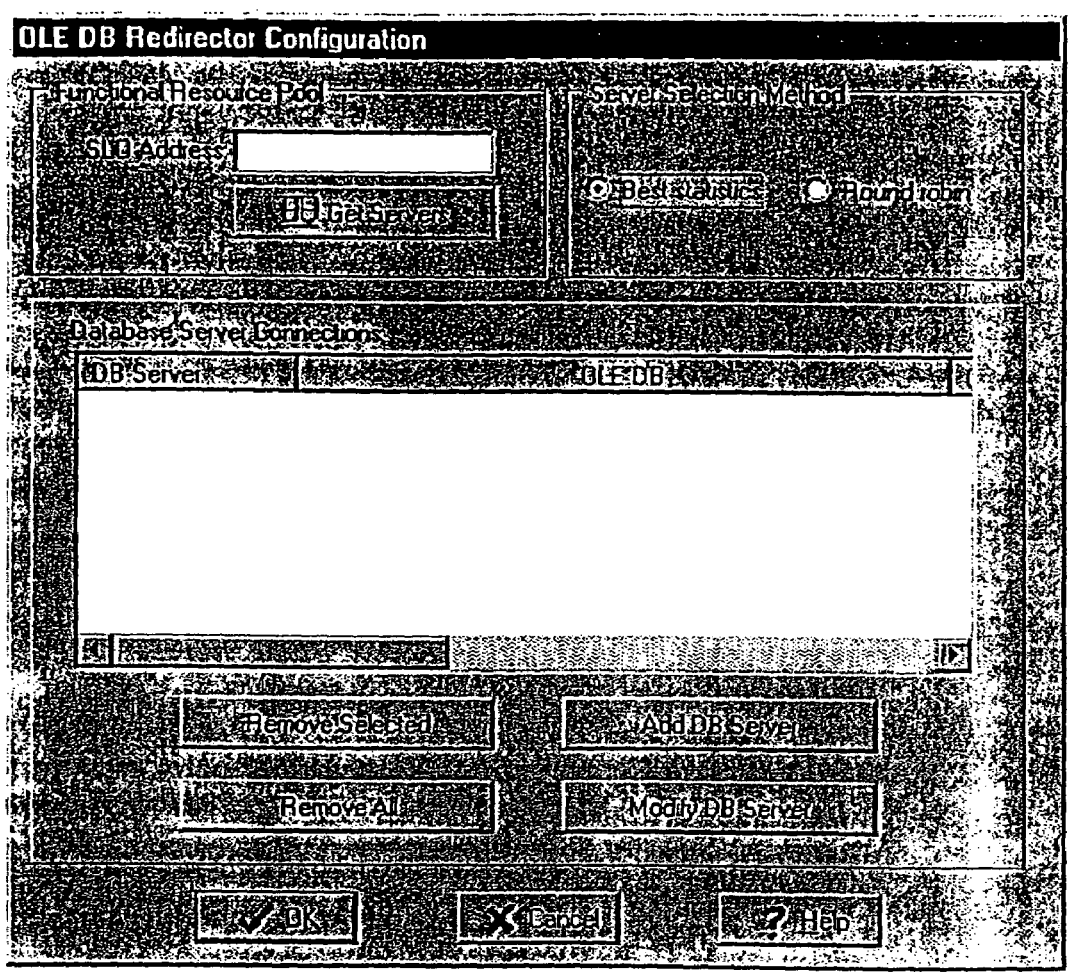
FIG. 5H shows an HTTP Redirector Configuration screen.

The HTTP Redirector Configuration screen is shown in FIG. 5H.

The Functional Resource Pool area is the source list of data base servers. The SLO Address field refers to an SLO-node installed in one of the computers belonging to the pool. Statistics are retrieved from a single SLO instead of asking individually. To retrieve the list of servers from the SLO-node the Get Servers button is pressed.

The Server Selection Method area indicates how servers are selected for redirection. Choices include a database server with the Best Statistic or Round Robin fashion. The Database Connection List displays a list of database servers and connection strings included for redirection. These are the database servers that might receive the redirector connection requests. Items in the list can be added, removed, or modified.

The Remove Selected button removes the selected database connection from the list. The removed connection is not included in any further redirection. The Remove All button is used to remove all connections from the list. The Add DB Connection button adds a database connection to the list. The Modify DB Connection is used to modify the parameters corresponding to a connection in the list.

Once all modifications are introduced, a configuration can be updated by pressing the OK button. Canceling the operation doesn't modify the current configuration.

Figure 5I:
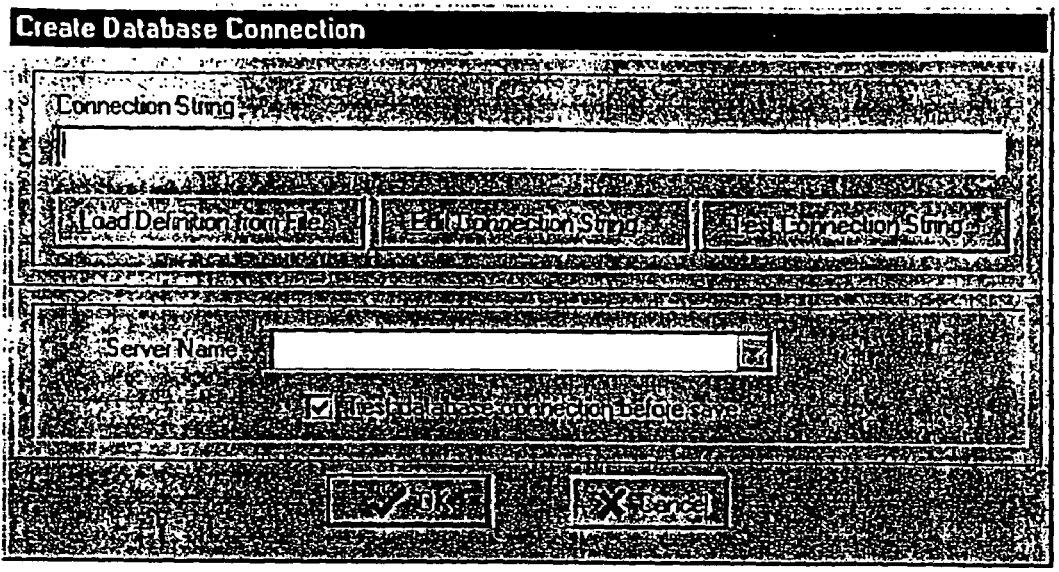
FIG. 5I shows a Create Connection dialog.

After clicking on the Add DB Connection button, the Create Connection dialog is shown in FIG. 5I. This dialog allows a new OLE DB connection to a database server to be defined. Connection parameters include a connection string and the name of the server.

The connection string can be typed directly, loaded from a Universal Data Link (UDL) file or edited using the corresponding system dialog. Connection strings can be manually or automatically tested before saving to the current configuration. Automatic testing is performed when the "Test database connection before save" box is checked. The testing process attempts to open a database connection using the given connection string.

Note that there are situations when testing a connection doesn't make sense. This occurs when the redirector and the database server are located on different domains. Applications requesting a connection might use aliases to reach the database servers and these aliases can be unknown to the redirector.

Figure 5J:
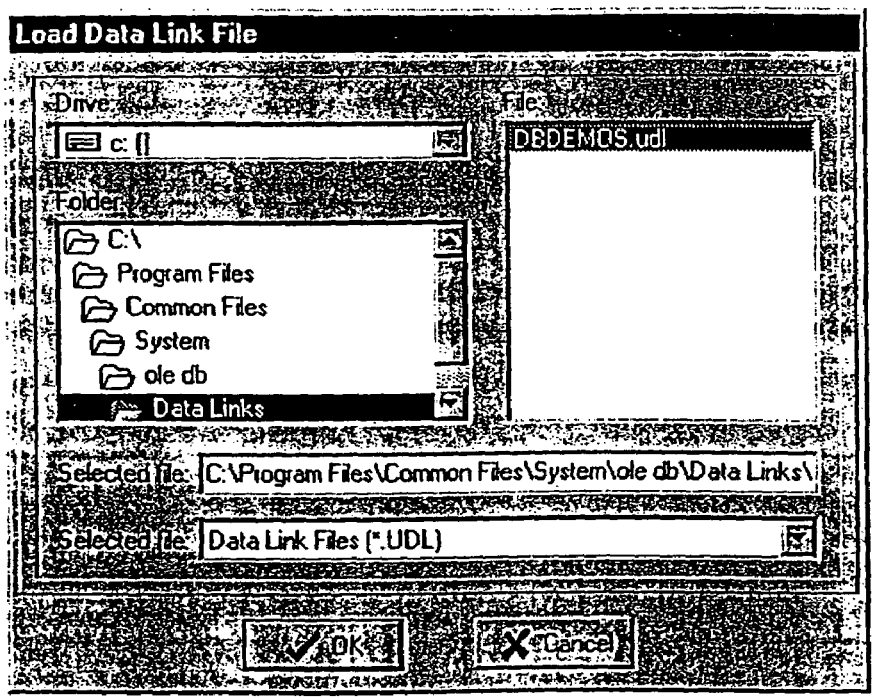
FIG. 5J shows a Load Data Link File dialog.

If the connection string is loaded from a file, then the file is selected using the Load Data Link File dialog, shown in FIG. 5J. This is a common dialog oriented to search for UDL files.

Figure 5K:
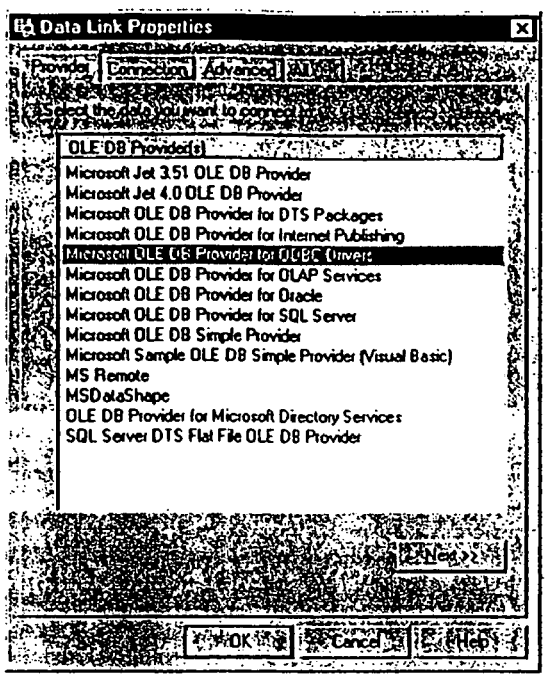
FIG. 5K shows the Data Link Properties window.

Another possibility is to select the Edit Connection String button, which opens the Data Link Properties window shown in FIG. 5K. This dialog contains a wizard that allows a step-by-step definition of the properties.

Figure 5L:
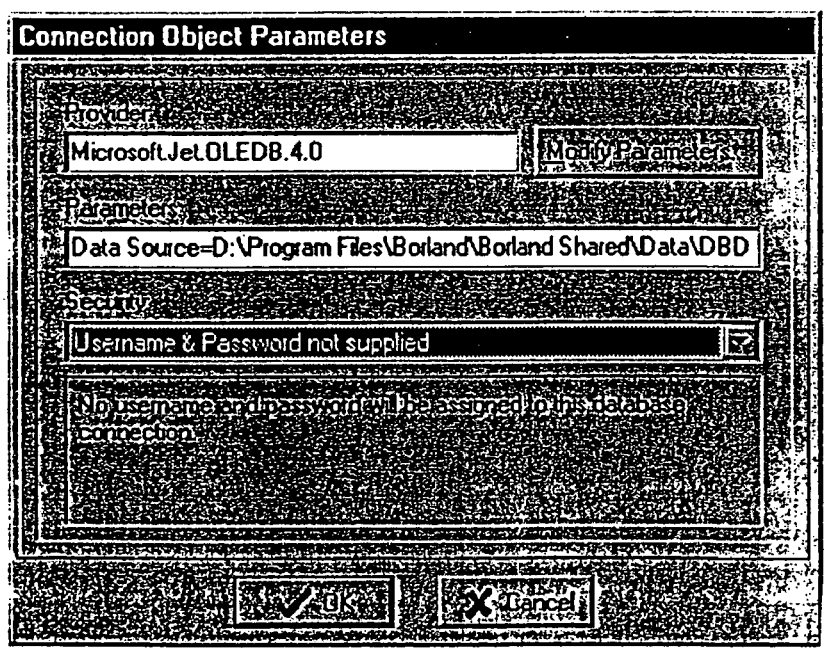
FIG. 5L shows the Confirmation dialog.

After loading from a file or defining through the Data Link wizard, the resulting connection string is loaded into a confirmation dialog, shown in FIG. 5L, which identifies the name of the provider, the parameters and the settings for security. FIG. 5L shows a confirmation dialog when security is turned off. The identification confirms the settings made previously. To change the provider or the parameters, the Modify Parameters button is pressed to return to the system wizard. Security settings can be modified directly in this dialog by selecting different security settings and/or modifying the username and password associated to the connection.

Figure 5M:
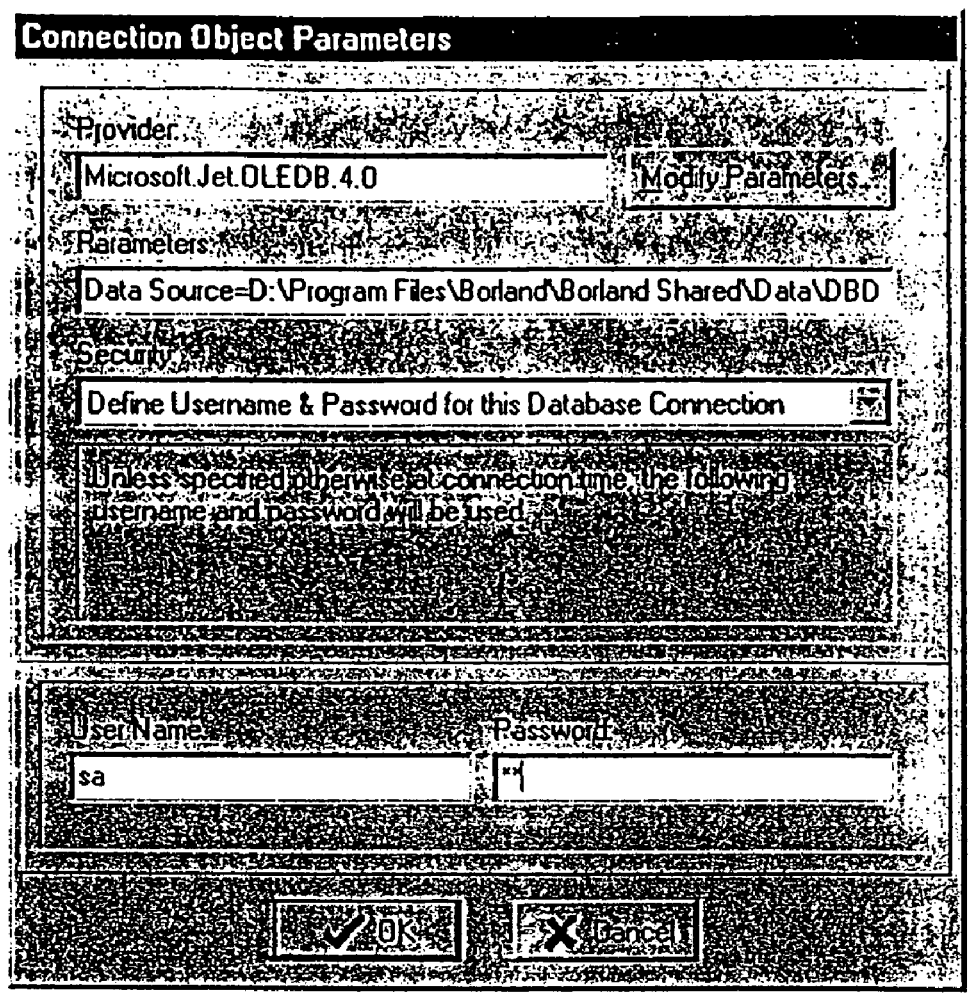

FIG. 5M shows the confirmation dialog with security turned on.

In FIG. 5M, once the OK button is pressed, control is returned to the Create Connection dialog, containing the resulting definitions.

The process of modifying an existing database connection includes some of the same steps discussed previously. To launch the process, a connection at the Configuration Dialog is selected and then the Modify DB Connection button is pressed.

System Level Objects

Before system optimization is determined, the value of each node is measured. In order to collect these measurements, intelligence objects (IOs) are deployed across a DASPO network. These intelligence objects gather statistics on the processes and system loads that are generated at each server node. The format, formation and use of the values, statistics and node information is discussed in detail in the co-pending patent applications referenced, above. Node information includes CPU usage, size and usage statistics of memory and storage space, bytes read/written per second, number of threads, number of processes executing at the node, processor queue length, local response time and network response time. Note that many other types of information about the node, node environment, node host, processor, etc., can be included. Also, not all of the listed node information need be used in order to practice the present invention. In general, any type of information about resource use, performance or other characteristics can be used.

As mentioned, a preferred embodiment of the invention uses two types of intelligence objects called System Level Object (SLOs) and Transactional Level Objects (TLOs). In a preferred embodiment, SLOs are the most commonly deployed intelligence object. Both SLOs and TLOs perform similar information gathering duties, but TLOs have the additional responsibility of providing statistics for any servers where special hosts (i.e., programs that provide data access and security between an application and a database) are set up. Note that a "host" or "host computer" can be any digital processing hardware device, or software process, that can perform a function on data in a network.

Before system optimization can be determined, the value of each node must first be measured. In order to collect these measurements, intelligence objects (IOs) are deployed across a DASPO network. These intelligence objects gather statistics on the processes and system loads that are generated at each server node. The most commonly deployed IO is the System Level Object (SLO).

SLOs can be installed on remote computers from a central point and is able to work across MS-Windows and TCP/IP networks. Installations can be made on computers running Windows 95/98, Windows NT, Windows 2000, Linux and Solaris UNIX. Depending on the platform, configuration and available services on the target machine, installations take place by means of ftp, telnet, network shared drives and/or DCOM.

The installation process consists of four main stages as follows: (1) Selecting target nodes; (2) Specifying server general settings (3) Specifying file-transfer and remote-execution settings for each node and (4) Executing the installation procedure.

The remote installation mechanism is built around a Windows application and a set of auxiliary files that are actually moved to the target computers to perform the installation. The remote installation mechanism consists of two parts—one for transferring files to the server, and another to launch the installation process on the remote server. For UNIX/Linux platforms, SLO is installed as a daemon. For Windows-based platforms, SLO is installed as a regular application included in the Startup folder for every user.

Figure 5N:
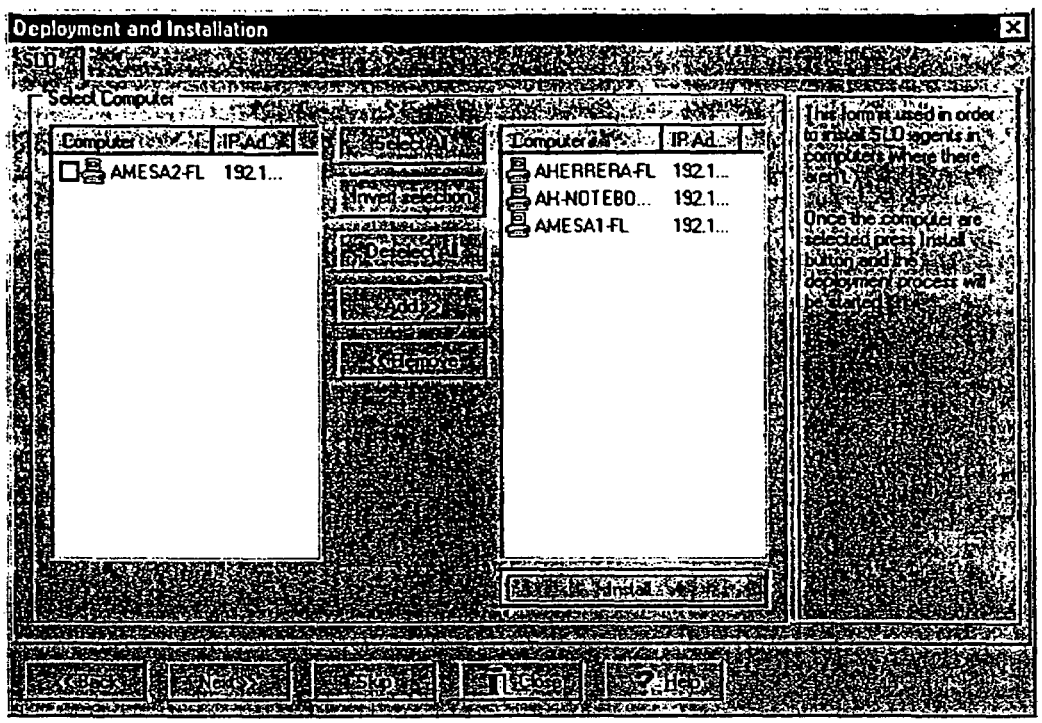
FIG. 5N shows the SLO Deployment and Installation window.

FIG. 5N shows the SLO Deployment and Installation window.

In the Deployment and Installation window, all available network nodes are displayed in the left-hand Computer column. Nodes that are scheduled to have SLO installed will appear in the right-hand computer column.

Select All allows the quick selection of all the nodes in the left-hand Computer column. Invert Selection is used when a long list of nodes is to be added for SLO installation. It is often easier to select the nodes in the left-hand Computer column that that aren't wanted and then press the Invert Selection button. Any selections that have been made will then be inverted. In other words, checked boxes will become unchecked and vice-versa.

Deselect All removes all checkmarks from the nodes selected in the left-hand Computer column. The Add button, adds nodes that have been selected in the left-hand Computer column and adds them to the SLO installation list. Nodes in the right-hand window that have been selected for SLO installation in the network can be removed by being selected and then clicking on the Remove button. Once the desired nodes are selected, the Install button is pressed to start the SLO deployment process.

Figure 5O:
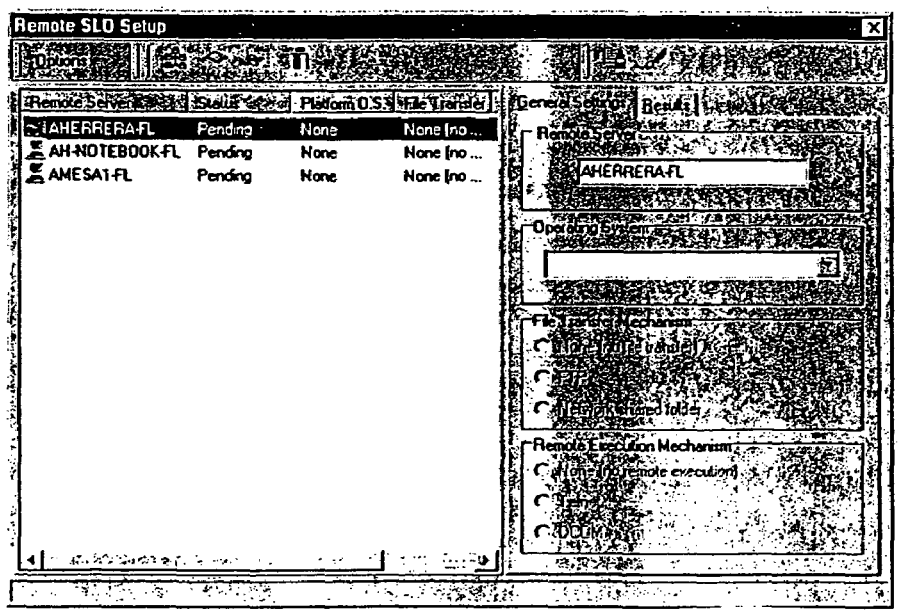
FIG. 5O shows the Remote SLO Set-up window.
Figure 5P:
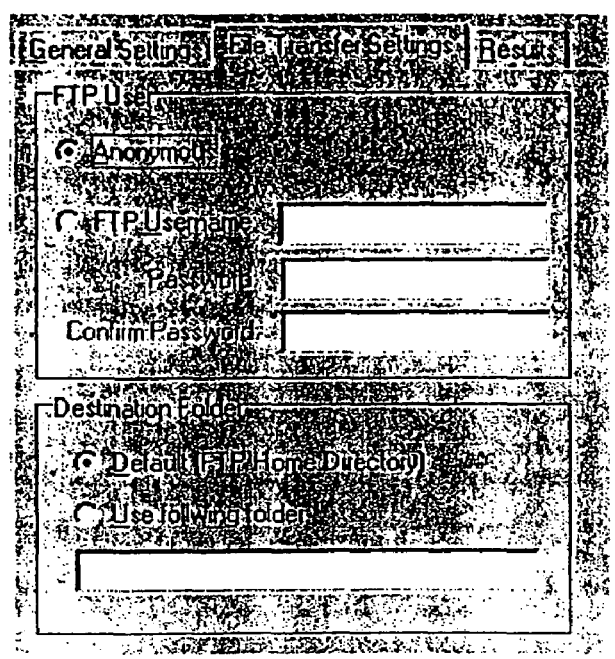
FIG. 5P is a first illustration specifying controls and parameters for transfer and remote execution functions.
Figure 5Q:
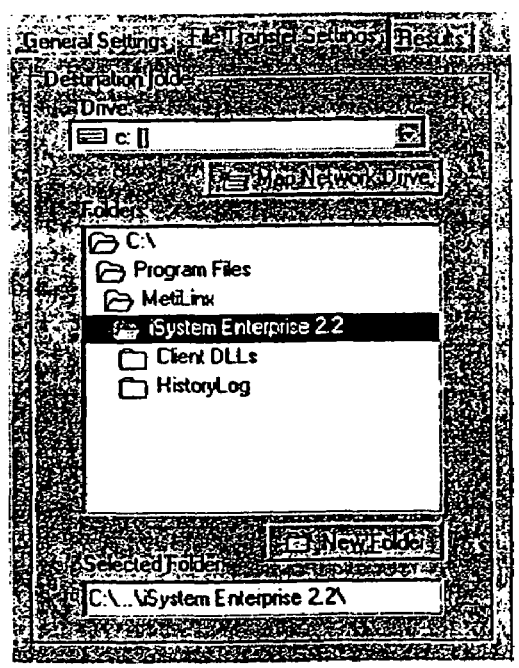
FIG. 5Q is a second illustration specifying controls and parameters for transfer and remote execution functions.
Figure 5R:
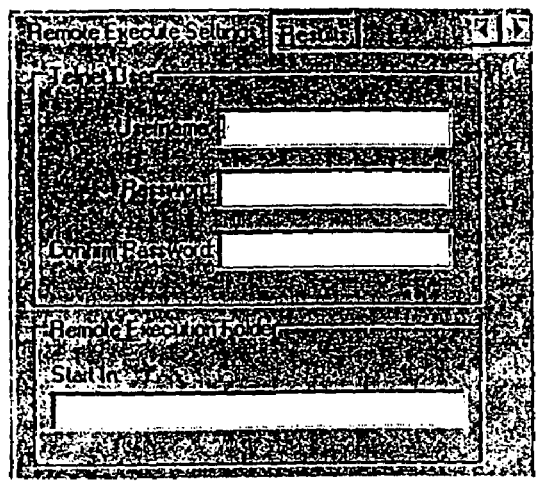
FIG. 5R is a third illustration specifying controls and parameters for transfer and remote execution functions.
Figure 5S:
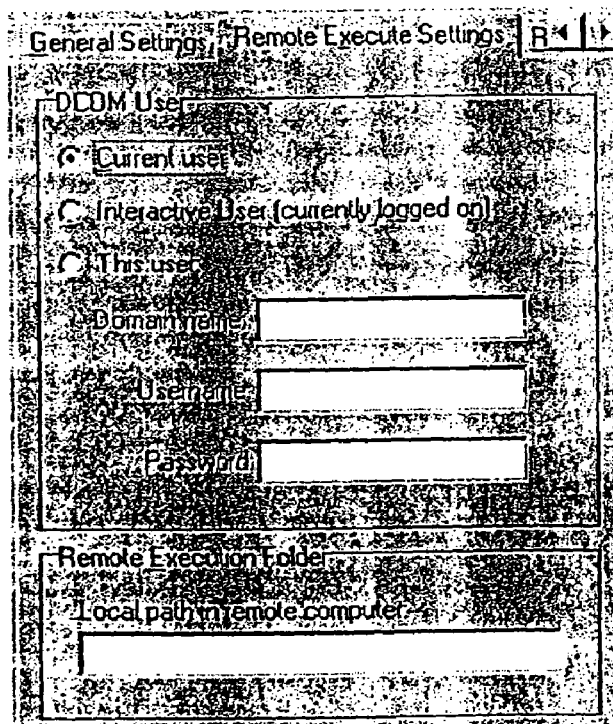
FIG. 5S is a fourth illustration specifying controls and parameters for transfer and remote execution functions.

Once nodes have been selected for SLO installation, the Remote SLO Setup window, shown in FIG. 5O, opens to allow specification of server general settings.

Specification of server general settings defines the operating system, file-transfer and remote-execution mechanisms for each node. (Note: nodes are referred to as Remote Servers in this window.) Selecting different file-transfer and remote-execution mechanisms activates corresponding tabs which appear behind the General Settings tab. These new tabs can require separate configuration. Any changes that are made in the General Settings tab are reflected in the list of nodes in the left-hand Remote Server field.

In the preferred embodiment, restrictions apply during this portion of the SLO setup. For example, DCOM is only available to Windows platforms. In some cases, selecting None for an operation mechanism can make sense. For example, if the corresponding files are already placed on a node (due to a previous attempt to install or because common drives are used), only remote execution is required.

FIGS. 5P-S illustrate specifying controls and parameters for file transfer and remote execution functions.

Depending on the file-transfer and remote-execution mechanisms that were selected in previous steps, one or more new tabs will appear behind the General Settings tab. The File-Transfer Settings for FTP tab allow specification of the FTP username and password (if applicable) and the FTP destination directory. By default the Anonymous username and the Home directory are set. The File-Transfer Settings for Shared Network Drives allows a Destination Folder to be selected, for example, when using a shared network drive to transfer files. This folder points to a drive (which is local to the node where SLO will be installed) that is shared along the network and mapped locally (at a central point). Common functionalities, such as mapping a network drive or creating a new folder are included. Note that file-transfer operations are carried out using the current user credentials, which means the current user must have enough rights to perform the operations.

When launching a remote setup using the telnet protocol, a username and password are required. The Remote Execution Folder points to a local folder (on the remote server) where the setup files were moved during the file-transfer step. The final way to launch SLO setup is using DCOM. During the file-transfer step, all necessary files were sent to a local folder on the remote server. The complete path for this folder should be typed into the Local path in remote computer" field. DCOM allows remote processes to be executed using different user credentials. This parameter is selected in the DCOM User field.

For a successful execution of the remote setup, the selected user must have rights to launch applications and access disk services through DCOM on the remote server. In terms of DCOM security, this means the user (or the group the user belongs to) must be listed in the "Default Access Permissions" (with Allow Access permission) and "Default Launch Permissions" (with "Allow Launch" permission). These lists can be seen and modified by executing the configuration application for DCOM and selecting the "Default Security" tab. For more information consult your DCOM documentation.

Once the parameters are defined for each server, the installation process can begin. To start the installation, the user selects a predetermined icon or button on the user interface. Once the installation process is launched; SLO files are transferred and launched for each specified node. Results, errors and notifications can be viewed under the Results tab as the installation is in progress.

Although the present invention has been discussed with respect to specific embodiments, these embodiments are merely illustrative, and not restrictive, of the invention. For example, although the invention is discussed primarily with reference to multi-tiered, or n-tiered, systems; it should be apparent that aspects of the invention can be used with any type of processing system even where the architecture does not include multiple tiers. Aspects of the invention can also be applied to stand-alone systems, or systems that are not considered networks.

Thus, the scope of the invention is to be determined solely by the appended claims.

What is claimed is:

1. A computer implemented method for monitoring the performance of a digital networked system, wherein the system includes first and second platforms, the method comprising:
   generating a first value indicating a characteristic of operation of the first platform;
   transferring the first value to the second platform;

obtaining a second value indicating a characteristic of operation of the second platform; and combining the first and second values into a composite value by adjusting one of the first or second values to account for a difference in operation characteristics between the first and second platforms wherein said difference in operation characteristics dynamically improves an object parameter value by a factor adjusted according to a block allocation parameter size through real time data collection in a Dynamic Aggregate System Process Optimization (DASPO) system to manage a heterogeneous network, wherein said DASPO allows an end user to define a set of node resource pools (NRP), wherein said NRP's are organized into Functional Resource Pools (FRLP), said FRP's linked to said NRP's to define a user specified system process flow and to define a sub network, wherein said specified system process flow and sub network provides a work flow specified by an end user to accelerate the display of results in a graphical interface without executing across the entire network, wherein the work flow creates a plurality of DASPO sub networks such that linked FRP processes are provided in a distributed, hierarchical, peer-to-peer performance management network application, wherein said peer-to-peer performance management network application takes network latency into account to modify a composite node value (CNV) or local node value (LNV), wherein said CNV's and LNV's are coupled with a central console such that data is accumulated to provide an end user with best node information, wherein said best node information allows an end user to optimize network performance by performing one or more of the following steps in any order: redirecting requests and connections within FRP's; using data generated by SLO nodes; computing said node specific statistics; and broadcasting said statistics results to a plurality of network specific applications.

2. The method of claim 1, wherein the difference in operation characteristics includes differences in the use of interrupts in processors in the first and second platforms.

3. The method of claim 2, wherein said difference in operation characteristics improves an object parameter value by a factor adjusted according to a block allocation parameter size, said interrupts in processors and corresponding first interrupts results value are displayed to an end user, said first interrupts results value used to derive a second interrupts results value through the use of a plurality of mathematical algorithms, using said second interrupts results to automate optimization of an n-tiered system.

4. The method of claim 1, wherein the difference in operation includes differences in the use of threads in the first and second platforms.

5. The method of claim 4, wherein said difference in operation characteristics improves an object parameter value by a factor adjusted according to a block allocation parameter size, said threads and corresponding first thread results value are displayed to an end user, said first thread results value used to derive a second thread results value through the use of a plurality of mathematical algorithms, using said second thread results to automate optimization of an n-tiered system.

6. The method of claim 1, wherein the difference in operation includes differences in the use of forked processes in the first and second platforms.

7. The method of claim 6, wherein said difference in operation characteristics improves an object parameter value by a factor adjusted according to a block allocation parameter size, said forked processes and corresponding first forked processes results value are displayed to an end user, said first forked processes results value used to derive a second forked processes results value through the use of a plurality of mathematical algorithms, using said second forked processes results to automate optimization of an n-tiered system.

8. The method of claim 1, wherein the difference in operation includes differences in memory management in the first and second platforms.

9. The method of claim 1, wherein the first and second platforms use different types of operating systems.

10. The method of claim 1, wherein the first and second platforms use different types of central processing units.

11. The method of claim 1, wherein the first and second platforms support different types of operating environments.

12. The method of claim 1, wherein said set of NRP's allow an end user to customize a user interface to add said NRP's by selecting the NRP's individually from an existing domain or by providing specific Internet protocol (IP) addresses.

13. The method of claim 1, wherein said NRP's are associated with intelligence objects (IO), said IO's are System Level Objects (SLO) or Transaction Level Objects (TLO), said SLO's and TLO's organized to support a common application such that nodes with like functionality are grouped in a sub system that provides a common service as defined by an end user.

14. The method of claim 1, wherein said redirection workflow is a pre-packaged set of application code and objects, whose code cannot be altered.

15. The method of claim 14, wherein said redirector includes objects for redirecting selected from a group of domains consisting of: HTTP-requests, OLE-DB-connections, HTTP in Java, DB in C++, Linux, Solaris, and domains and platforms.

16. The method of claim 15, wherein said redirector is a Windows-based application HTTP Redirector (HTTPRedir.EXE) capable of receiving HTTP-requests and redirecting them to a selected web server according to an end user predefined selection criteria.

17. The method of claim 1, wherein said redirector consists of one or more of the following steps in any order: selecting nodes for redirector installation; specifying server general settings for each node; specifying file-transfer and remote-execution protocol settings for each node; executing redirector installation procedures; and configuring the installed redirectors.

18. The method of claim 1, wherein said redirector method is a remote installation process built upon a Windows based application (RSLOSetup.EXE) and a set of auxiliary files that are actually moved to a target node to perform the installation; said remote node executing said set of auxiliary files coupled with a corresponding protocol embedded on said remote node, implemented through the use of a mapped change configuration command for use once nodes have been selected as redirectors and the file transfer and execution is complete.

19. The method of claim 18, wherein the remote installation process is a server redirector method built upon a Windows based application (RSLOSetup.EXE) and a set of auxiliary files that are actually moved to a target server to perform the installation; said remote server executing said set of auxiliary files coupled with a corresponding protocol embedded on said remote server, implemented through the use of a mapped change configuration command for use once servers have been selected as redirectors and the file transfer and execution is complete.

20. The method of claim 1, wherein said best node information allows an end user to optimize network performance further comprises performing one or more of the following steps in any order: creating a redirector listening port, wherein said port listens for HTTP requests and by web browsers to connect; creating an FRP comprising a list of web servers; creating an SLO address field referring to an SLO-node installed in one of the computers belonging to said FRP; and creating a server selection rule process directing how servers are selected for redirection.

21. The method of claim 20, wherein said server selection process further comprises a DCOM server in a Windows-based executable process, said process called an "OLE-DB-Connection Redirector", said process is an object able to keep track of load statistics of a set of end user defined database servers and to supply a user predefined connection string corresponding to the selected database server when requested, said redirector object must be active to monitor the database servers.

22. The redirector method of claim 21, wherein said redirector allows an end user to perform the following steps: creating a remote instance of said redirector; requesting a valid connection string therefrom; and using said connection string to provide a guarantee that the best available database server is selected.

23. The computer implemented method of claim 1, further comprising an automated method to set-up, analyze and optimize a heterogeneous, multi-domain computer network utilizing a Dynamic Aggregate System Process Optimization ("DASPO") system wherein said DASPO selects a server from a Functional Resource Pool utilizing a plurality of user defined rule processes.

* * * * *